US012655876B2

(12) United States Patent
Olson et al.

(10) Patent No.: US 12,655,876 B2
(45) Date of Patent: Jun. 16, 2026

(54) DISC COUPLING

(71) Applicants: David William Olson, Menomonee
Falls, WI (US); **Matthew Joseph
DeFord**, New Braunfels, TX (US)

(72) Inventors: David William Olson, Menomonee
Falls, WI (US); **Matthew Joseph
DeFord**, New Braunfels, TX (US)

(73) Assignee: PSC Couplings, LLC, Richfield, WI
(US)

( * ) Notice: Subject to any disclaimer, the term of this
patent is extended or adjusted under 35
U.S.C. 154(b) by 330 days.

(21) Appl. No.: 18/481,553

(22) Filed: Oct. 5, 2023

(65) Prior Publication Data

US 2025/0116301 A1      Apr. 10, 2025

(51) Int. Cl.
F16D 3/79          (2006.01)
F16D 3/78          (2006.01)

(52) U.S. Cl.
CPC ................. F16D 3/79 (2013.01); F16D 3/78
(2013.01); F16D 2250/0084 (2013.01)

(58) Field of Classification Search
CPC ....... F16D 3/79; F16D 3/78; F16D 2250/0084
USPC ............................................... 464/94–96, 99
See application file for complete search history.

(56) References Cited

U.S. PATENT DOCUMENTS 2,846,857 A * 8/1958 Hagenlocher ............. F16D 3/78
464/95
4,055,966 A 11/1977 Fredericks 4,744,783 A 5/1988 Downey et al.
8,881,515 B2 * 11/2014 Lindemann ........... F16F 15/133
9,771,983 B2 * 9/2017 Marks ................... F16B 37/122
10,495,152 B2 12/2019 Marks et al.
2017/0067513 A1 3/2017 Marks
2017/0067585 A1 3/2017 Marks
2018/0291964 A1 10/2018 Kleinewegen et al.

FOREIGN PATENT DOCUMENTS

KR        20130043248 A      4/2013

OTHER PUBLICATIONS

Mancuso, Jon A., Couplings and Joints, Marcel Dekker, Inc., New
York, pp. 462-475, TJ183.M36. (Year: 1999).*
https://www.rexnord.com/contentitems/techlibrary/documents/2000_
catalog; known prior to Oct. 5, 2023.
https://www.rexnord.com/contentitems/techlibrary/documents/cp3-
001_manual; known prior to Oct. 5, 2023.

(Continued)

*Primary Examiner* — Greg Binda
(74) *Attorney, Agent, or Firm* — Reinhart Boerner Van
Deuren P.C.

(57)          ABSTRACT

A disc pack includes stacked disc plates defining a first side
and second side of the disc pack. Bolt holes extend through
the sides of the disc pack and define a bolt circle. Bushings
extend through the bolt holes. Each bushing includes a head
at a first end bearing against the first side of the disc pack and
a second end that extends axially outside the bolt hole. A
washer surrounds at least a portion of the second end and
bears against the second side of the disc pack to hold the disc
plates together. The disc pack is configured to increase from
a first diameter defined by the bolt circle to a second
diameter defined by the bolt circle that is at least 0.37%
greater than the first diameter when the disc pack is pre-
stretched.

20 Claims, 17 Drawing Sheets

(56) References Cited

OTHER PUBLICATIONS https://www.johncrane.com/-/media/j/johncrane_com/files/products/technical-specification/couplings/tds_tsk-tlk-series_final_hires_nocrops.pdf; known prior to Oct. 5, 2023.

TSK T Series Coupling Manual; known prior to Oct. 5, 2023.

https://api.mssassetworks.com/assets/REG/download/9966E; known prior to Oct. 5, 2023.

https://www.flender.com/en/media-download/media/FLE10_standard_coupling; known prior to Oct. 5, 2023.

https://www.rexnord.com/contentitems/techlibrary/documents/538-210_manual; known prior to Oct. 5, 2023.

https://www.rexnord.com/contentitems/techlibrary/documents/538-610_manual; known prior to Oct. 5, 2023.

https://api.mssassetworks.com/assets/REG/download/8887E; known prior to Oct. 5, 2023.

https://www.tbwoods.com/-/media/Files/Literature/platform/altra-couplings/p-7526-cg.ashx; known prior to Oct. 5, 2023.

* cited by examiner

DISC COUPLING

FIELD OF THE INVENTION

This invention generally relates to couplings, and more particularly to mechanical couplings utilized to transfer a rotational torque while accommodating misalignment.

BACKGROUND OF THE INVENTION

For power transmission in the form of a torque from a drive component, which is usually a motor, engine, turbine, or other power source to another device, referred to as the driven component, which is usually a gear box, pump, generator, compressor, or other device receiving the power, a coupling may be utilized. An input torque from the power source from the drive end is transferred via the coupling to the driven end. Such a coupling may be a single unitary component, such as a simple shaft, or an assembly of multiple components which are aligned along a common longitudinal axis, which is the axis about which the multiple components of the coupling rotate, that is the rotational axis. A coupling comprising an assembly of multiple components is described in U.S. Pat. No. 10,495,152 to Marks et al., (hereinafter, the '152 patent) the entire teachings of which are incorporated as if fully set forth herein.

In the context of a coupling assembly, each component thereof is typically a shaft element having a flange at one or both ends thereof for connection to other similarly shaped components of the assembly. The flange of each component typically has a hole pattern, providing a bolt circle (a circle extending through the center of each bolt hole of the pattern) for receipt of a plurality of fasteners, which are typically bolts or the like. For each bolt, an associated nut is typically utilized as well. As a result, the flanges of adjacent components of the coupling assembly are interposed between a number of bolt heads and associated nuts when fully assembled.

In coupling designs, designers seek to minimize or eliminate runout and maximize torque transmission. But these two design elements must be balanced against ease of assembly and production costs. Regarding runout, designers seek to keep all the components of the coupling rotating about the same rotational axis. Regarding torque, designers seek to provide a coupling with the ability to transmit the greatest amount of torque through the coupling without failure of the coupling.

Regarding runout, ideally there is a single rotational axis about which the drive end and driven end rotate. However, given the number of components from the power source, the drive end of the coupling, the driven end of the coupling and that which is driven, typically there is some deviation between the ideal single rotational axis and the rotational axis of each component. Indeed, once all the components of the coupling are in the field and subject to torque, there is typically a deviation between the rotational axis of each component such that there is no single rotational axis. For example, the axes may still be parallel, but just not colinear. Once this occurs, that is a deviation between each component's axis of rotation, then the coupling is liable to experience excessive vibration, wear or fail. Accordingly, designers seek to minimize or eliminate runout, that is keep the axis of each component rotating about a single rotational axis of the assembly.

Disc packs have been introduced in couplings to allow misalignment between the driver and driven equipment. The disc packs flex to allow axial, parallel, and angular misalignment. They also can act as a fuse. The discs should fail before the connected equipment fails when an unexpected high torque load is seen. Runout is exacerbated by introducing these disc packs as additional components connecting the parts of the coupling. Further, disc packs include bolts extending through bolt holes of the disc pack. The bolts hold the plates of the disc pack together and providing a means to couple the disc pack to a mating flange of the coupling assembly. Links are created in the metal area between the bolt holes of the disc packs. These links have been found to buckle under compressive load. To address this, disc packs in the prior art disc packs are pre-stretched at installation to allow the compressed sections to relax to neutral under load as they are compressed.

Pre-stretch is achieved by drilling the bolt circle diameter on the mating flanges larger than the bolt circle of the flex elements of the disc pack. In other words, the bolt circle in the disc packs is smaller than the bolt circle in the mounting flanges of spacers, hubs, and adapters. This creates pre-stretch, which stretches the links to eliminate buckling torque fatigue during start up, and resists buckling under oscillating torque loads. Pre-stretch may allow the compressed sections between bolt holes to relax to neutral under load as they are compressed and thereby avoid buckling. Pre-stretch also takes up any tolerance gaps between the disc pack components to create a tight connection which will minimize runout and the chances of wear from forces from vibration.

While pre-stretch may improve the amount of torque a coupling can withstand before failure and improve runout, the design disadvantageously increases the difficulty in assembly because of the amount of pre-stretch it provides. The different diameters between the bolt circle of the disc pack and the bolt circle of the mating flange make assembly difficult because the centers of the bolt holes are designed not to align. Often times, those assembling the flange to the disc pack seek to use shoulder bolts extending through the bolt holes of the disc pack as lever arms trying to stretch the disc pack to align the bolt holes. Other times, the bolt holes simply will not align, and one or more bolt holes are reamed in a mating flange a larger diameter to allow the bolt to go through the disc pack and flange, likely changing the pre-designed structural characteristics the disc pack and mating flange were meant to have. This additional work in aligning the disc packs to their mating flanges results in lost labor time and therefore increased costs. Moreover, where a shoulder bolt has to be hammered into position or a new hole reamed, early failure of the coupling is which increases costs for the user in premature replacement of the disc packs or the entire coupling.

FIG. 17 illustrates a prior art coupling 10 sold as the "Thomas® Flexible Disc Couplings" with a disc pack 12. In the Thomas® design, the disc pack 12 includes sleeves 14 pressed through bolt holes of the disc pack 12 and into washers which are included in the disc pack 12 to hold it together. The sleeves 14 are not threaded. The sleeves 14 of the disc pack 12 do not introduce a pre-stretch to the disc pack 12. Instead, the disc pack 12 is configured to have a pre-stretch once the bolts 16 are pushed through the sleeves in the disc pack at assembly with flange 18 of the hub and flange 20 of the centerpiece. However, because of the differences in the diameter between the bolt circle of the disc pack 12 and that of the flanges 18, 20, pushing the bolt 16, and in particular the last bolt 16, through the flanges 18, 20 and through the disc pack 12 is difficult, such that assembly may be time consuming and require a large amount of force, for example, hammering the bolt or even reaming the bolt hole in the flange to a larger diameter so as to complete the assembly of the coupling 10.

For example, the operator mounting the disc pack 12 to the flange 18, 20 of the coupling 10 may resort to forcing the bolts 16 through the flanges 18, 20 and through the disc pack 12. Indeed, operators have been known to hammer the head of the bolt 16 to force it through the flanges 18, 20 and the disc pack 12.

However, this subjects the disc pack 12 to a hammering force it was not designed to withstand. Still further, where hammering is not able to push the bolt 16 through the assembly, operators may ream one or more bolt holes of the flanges 18, 20 to a larger diameter resulting in the same deleterious effects as just described with respect to hammering, and perhaps even worse effects on runout and torque efficiency or levels. Moreover, these assembly problems delay and frustrate the operators trying to assemble the coupling. The premature wear of the coupling 10, the lost time in labor and production is problematic.

Other problems with disc pack 12 include sleeves 14. Neither the sleeves 14, nor the disc pack 10 provide any locating feature to align the disc pack 12 with the mating flanges 18, 20 of the coupling 10. During assembly of the coupling, as the bolts are pushed through the flanges 18, 20, the bolts do not have a pivot point of leverage to act as a lever arm to induce the stretch in the disc pack required to align the bolt holes of the flanges 18, 20 to the bolt holes of the disc pack 12 to be able to push the bolts 16 through the bolt holes of the disc pack 12. Moreover, the threadless sleeve 14 design is designed specifically to keep the tolerance between the bolt 16 and the sleeve 14 small. This design is intended to make for a tighter fit between the sleeve 14 and the bolt 16 extending therethrough and thereby minimize the amount of movement allowed therebetween during operation. However, because of the small tolerances, the bolt must be specially made. The bolts must be of exact length, including their shoulder length, thread length and diameter, which increases costs relative to a design without such specialty fasteners. This small tolerance is also true between the bolt shoulder and the bolt hole in the flange 18, 20. Because of this tight fit, there is no pivot point of leverage for the bolt to stretch the disc pack 12. Also, this tight tolerance is true with other prior art designs that may not have sleeves where the disc bolt hole receives a bolt directly with the same type of tight tolerances.

The tight tolerance design in prior art coupling 10, together with its disc pack 12 having a bolt circle that is smaller than the bolt circle of the flanges 18, 20 to which the disc pack 12 mounts, makes assembly difficult. So too, because of the foregoing, the end user of the disc pack 12 is limited in the size of the bolt circle of the flanges that can be used with the disc pack 12. Manufacturers and users would like to see the manufactured disc pack 12 compatible with the greatest range of bolt circle sizes as possible to provide the most advantageous level of pre-stretch when replacing worn or failed disc packs in their couplings.

Turning to the prior art coupling described in the '152 patent, the disc pack includes two pilot rings sandwiching stacked disc plates of the disc pack therebetween. By stacked disc plates, it is meant they have at least one face bearing against the face of another disc plate. Thus, the pilot rings are not disc plates. The pilot rings are much thicker than disc plates. The pilot rings do not bear against any disc plates. The pilot rings serve an entirely different function than the disc plates. The pilot rings serve to hold the disc plates together, act as a retention member when assembled to a mating flange, center the disc pack about the axis of rotation, and are coated to provide a friction fit with a mating flange so that the disc pack transmits torque via the friction fit between the pilot rings of the disc pack and the mating flange. The disc plates are held together by bushings pushed through bolt holes of the two pilot rings and discs. At least one end of the bushings is swaged against a respective pilot ring so as to sandwich its disc plates between the pilot rings to hold the disc pack together.

While a washer is present over each of the bushings, it is not press fit and does not hold the disc pack together. Moreover, the bushings are not symmetrical and have a keyed/non cylindrical portion to prevent rotation in the holes of the pilot plate. However, this asymmetry has proven to make insertion/pushing the bushings through the disc plates difficult. Moreover, in this design the disc pack is clamped together between the two pilot rings via the compression force provided between the ends of the swaged bushings. This limits the range of pre-stretch, if any, that the disc pack which includes the pilot rings can achieve when mounted to a mating flange and limits the amount of its flexibility to align with bolt holes of a mating flange making assembly difficult.

The two-pilot ring disc pack, while effective in providing an acceptable runout and providing the necessary torque transmission characteristic for the coupling, is expensive and difficult to assemble because the outermost peripheral faces of the outermost diameter of the pilot rings must be machined to size for proper fit with the flanges they fit to in assembly. This presents a further machining operation that must be performed that is not present in disc packs without such pilot rings. Faces of the pilot rings that face and bear against the flanges they are coupled to are coated, e.g., tungsten carbide, to provide a sufficient coefficient of friction between the disc pack and flange to provide for sufficient transmission of torque. Indeed, the principle of torque transmission must be a friction interface of the disc pack's coated pilot rings and the mating flange.

The use of the pilot rings, coatings, the machining of the outermost peripheral surface of the disc pack, and the keyed (not circular bodies) required by the bushings has proven costly to produce. This design, while effective, has proven to be limited in the range of pre-stretch that it can provide and has proven to be limited in the amount of torque it can withstand prior to slip and failure.

BRIEF SUMMARY OF THE INVENTION

The invention provides a coupling assembly having a centerpiece with an integral flange at a first end and an integral flange at a second end opposite the first end. The assembly and components of the coupling at the first end and the second end are each the same and therefore a description of the assembly and elements at the first end is equally applicable to the assembly and elements at the second end. Each flange of the centerpiece is coupled to a respective disc pack made up of stacked disc plates and washers and bushings. Each disc plate has a first axial side and a second axial side opposite the first axial side. Bolt holes that are evenly spaced apart from one another are through holes extending between the first side and the second side of each respective disc pack. A circle extending through the center of each bolt hole of the stacked disc plates of a respective disc pack defines a bolt circle of the disc pack. The centerpiece, the stacked disc plates, the adapter plates, the bushings and washers are made of steel but may also be made of cast iron.

In an embodiment of the coupling assembly, each disc pack is coupled to an adapter plate to form a centerpiece assembly. Each adapter plate is coupled to a respective disc pack and then the adapter plate is coupled to a respective hub to form the coupling assembly. In another embodiment each disc pack is coupled to a hub flange and no adapter plate is used. The teachings of the instant application provide for a disc pack. The invention also provides for a centerpiece assembly with the disc packs coupled thereto. The invention also includes a centerpiece assembly with adapter plates coupled to the disc packs. The invention provides for a coupling assembly with the centerpiece assembly including the disc packs. The invention also provides for a coupling assembly with the centerpiece assembly with the disc packs but no adapter plates, instead hubs are mounted directly to the disc packs of the centerpiece assembly. The disc packs, the centerpiece assemblies, and the coupling assemblies as well as the method disclosed herein heretofore are not know in the prior art.

The disc pack of the instant invention has bushings with axial extensions outside the bolt hole on either side of the disc pack and has internal threads that improve not only the ease of assembly of the disc pack to the centerpiece and adapter plate, but to the surprise of the inventors, improve the amount of torque the coupling assembly can transmit before failure and without slip, improve the range of pre-stretch that can be provided by the disc pack, and improve the runout of the coupling assembly.

In an embodiment each disc pack is made up of stacked plates having a scalloped outermost peripheral surface and a center bore such that the plates are ring like. The scalloped plates have bolt holes uniformly spaced apart from one another and extending through all the plates. The bolt holes define a bolt circle of a first diameter. The plates of the disc pack are secured by a head of the bushing on one side of the disc pack and a washer fit over a second end of the busing such that the washer bears against the second side of the disc pack. It is not the intent to limit the embodiment to scalloped stacked plates as other geometries of the disk plates are possible, for example round outer most peripheral surfaces.

The bushings that are inserted into each disc pack are T-shaped with a head at one end with an outermost diameter larger than an outermost diameter of the bushing at a second end opposite the head. The outermost peripheral surfaces of the bushings are entirely circular such that there is no keyed relationship between the bushing and the bolt hole surrounding the bushing. In an embodiment, the head of the bushing does not have an entirely circular outermost peripheral surface, but instead may be a hex head. The hex head permits use of a tool thereon to prevent the bushings rotation during assembly and disassembly.

Each bushing includes internal threads extending the entire longitudinal length of the bushing. A first set of the bushings are inserted into the bolt holes of the stacked disc plates disc stack in a first direction such that their heads bear against the disc pack on a first side while washers are placed over the axially extending second end of the bushing and abut a second side of the disc pack that is opposite the first side of the disc pack.

By axially extending, it is meant that the bolt hole of the disc pack defines a longitudinal axis. Further, the bolt hole starts at a first side of the disc pack and ends at a second side of the disc pack. Therefore, the second end of the bushing is inserted into the bolt hole until the head of the bushing meets the bolt hole and acts as a stop to prevent further axial movement into the bolt hole. The diameter of the head of the bushing is too large to permit its insertion into the bolt hole.

Therefore, the head of the bushing "axially extends" outside the bolt hole. So too, the second end of the bushing once inserted through the bolt hole "axially extends" outside the bolt hole.

The head as one of the axial extensions of the bushing is received into a clearance of hole of a mating flange to act as a retention member, should there be a disc pack failure. By mating flange, it is meant to be understood that any of the following flanges coupled to one of the disc packs, the flanges at the first end of the centerpiece, the flange at the second end of the centerpiece, the adapter plates, or where there is no adapter plate and instead the hub flange. The head also provides a locating function by locating the disc pack in proper position on the mating flange in order to allow the disc pack to be coupled completely to the mating flange. Further, the second end of the bushing that is an axial extension is received in a locating pocket of a mating flange. As such, the axial extension of the second end acts as a lever arm that induces pre-stretch into the disc pack during assembly and advantageously provides a locating function for aligning the second end in the locating pocket of the mating flange.

A second set of the bushings are inserted into the bolt holes in a second direction opposite the first direction such that their heads bear against the second side of the disc pack and washers are placed over their second ends such that the washers abut the first side of the disc pack. With such assembly, the plates of the disc pack are secured between the heads of the bushings and the washers of the bushing as described above with respect to the first set of the bushing.

In an embodiment of the bushings, a hex key is defined in each head of the bushing, or a hex head is present on the head of the bushing. In the embodiment, where the bushing includes a hex key or hex head, bolts are threaded into the bushings during assembly of the disc pack to a mating flange. Use of the hex key or hex head with the bolts with respect to the bushings provides further assurance against unwanted rotation of the bushing during assembly of the disc pack to the center member or adapter. Moreover, after use of the disc pack in the coupling, removal of the disc pack may be facilitated by the hex key and bolt arrangement. While a hex key or hex head may be provided in the head of the bushing to receive a cooperating tool, it is not the intention to limit the head to include only a hex key as other means may be used, for example the head may define an external hex head.

Once each disc pack is assembled, a first disc pack can be coupled to a flange of the centerpiece and a second disc pack can be coupled to the other flange of the centerpiece. Each flange of the centerpiece includes clearance holes that are through holes spaced evenly apart from one another. Each flange of the centerpiece also includes counterbores that are spaced evenly apart from one another and act as locating pockets for the second end of the bushings. The counterbores are stepped cylindrical through holes that have a first portion of a first diameter and a second portion of a second diameter less than the first diameter.

The second portion of each of the counterbores is located closer to an inner axially facing face of the flange than the second portion. The first portion of the counterbore has an opening defined by the outward axially facing side of the flange. By inward axially facing, it is meant the centerpiece has a first flanged end and a second flanged end opposite the first flanged end and a portion between the first flanged end and the second flanged end. Therefore, inward axially facing means axially facing the portion between the first flanged end and the second flanged end and outward axially facing means axially facing away from the portion between the first flanged end and the second flanged end.

A circle extending through the centers of the counterbore and the clearance holes defines a bolt circle of the flange of the centerpiece. The diameter of the bolt circle of the flange of the centerpiece is greater than the diameter of the bolt circle of the disc pack such that when the disc pack is coupled to the flange of the centerpiece, the diameter of the bolt circle of the disc pack increases to equal the diameter of the bolt circle of the mating flange. This increase in the diameter of the bolt circle of the disc pack is what imparts the pre-stretch to the disc pack.

Each disc pack in a first state, that is a state where the disc pack is not mounted to a mating flange, has a bolt circle of a first diameter. However, the disc pack in a second state, that is, the state wherein the disc pack is coupled to a mating flange has a bolt circle defining a second diameter that is greater than the first diameter of the first state. The increase from the first diameter to the second diameter is a measure of the pre-stretch in the disc pack in the second state. In this sense, it can be said that the disc pack in a second state has a pre-stretch wherein the bolt circle has a second diameter that is at least 0.37% greater than the first diameter and, in an embodiment, can be between 0.37 and 0.74% greater than the first diameter. Heretofore, a disc pack that can increase a bolt circle diameter by at least 0.37% to create the pre-stretch in the disc pack when coupled to a disc pack that heretofore has not been known. Indeed, this is even more notable considering the disc pack can increase its bolt circle diameter by at least 0.74% has not been known.

During assembly, the disc pack is placed over the outward axially facing face of the centerpiece flange such that the clearance holes of the flange align with and may at least partially receive the heads of the bushings facing the centerpiece flange. In this sense, the heads may be considered first locators. This placement also assists in aligning the internal threads at the second end of the bushings with openings of the locating pockets of the centerpiece flange.

Next, instead of trying to push screws through the locating pockets of the center flange and the disc pack, according to the teachings of the instant invention, the threaded end of the fastener is pushed through the locating pocket until it meets with the second end of the bushing which is located, if not partially in the locating pocket, sufficiently near the locating pocket that fastener can reach it and be threaded into the second end of the bushing. The fastener may be, for example a cap screw or bolt that is inserted through the threadless locating pockets in the direction from the inward axially facing side toward the outward axially facing side. As the threaded end of the fastener is threaded into the bushing, the bushing is then pulled into the second portion of the locating pocket. The same foregoing steps are repeated for assembling the second disc pack to the second flange of the centerpiece. Once the centerpiece has both disc packs secured to its flanges, the adapter plates can be attached to each of the disc packs.

This means of assembly is a significant improvement over the prior art where because of the different bolt circle sized between the disc pack and the mating flange, alignment of the bolt holes with the holes in the mating flange at times required hammering to force alignment. Moreover, specialty bolts with specific shoulder length and overall bolt length had to be pushed through the mating flange and the bolt holes to assemble the coupling, the structure, and method according to the teaching of the instant invention overcome this difficulty in assembly.

Next, the adapter plate is placed over the disc pack such that the clearance holes of the adapter plate align with and may at least partially receive the heads of the bushings facing the adapter plate. Thus, hereto, the heads act as a first locator for proper alignment of the adapter plate with the disc pack. This placement in turn assists in positioning the internal threads at the second end of the bushing with the locating pockets of the adapter plate.

As was described with respect to the assembly of the disc pack to the centerpiece flange, hereto, according to the teachings of the instant invention, the threaded end of a fastener, for example a cap screw or bolt is inserted through the threadless locating pockets in the direction from the outward axially facing side of the adapter plate toward the inward axially facing side of the adapter plate. Once inserted through the locating pockets, the threaded end will meet the internal threads of the second end of the second set of bushings extending from the disc pack and facing locating pockets of the adapter plate. Like the center flange, the locating pockets are stepped cylindrical through holes and counterbores with a first portion of a first diameter and second portion of a second diameter. The clearance holes and the locating pockets of the adapter plate define a bolt circle that is the same diameter as the center flange.

The second end of the bushings on the disc pack threadingly receives the threaded end of the fastener. As the fastener is threaded into the bushing, the bushing is pulled into the second portion of the counterbore defining the locating pocket to fully couple the adapter plate to the disc plate.

This means of assembly is a significant improvement over the prior art where specialty bolts had to be pushed through the adapter plate or flange hub and the bolt holes of the disc pack to assemble the coupling. This process of inserting a fastener through the locating pocket of the adapter plate and then threading it into the second end of the bushing is repeated for each locating pocket of each adapter plate. Once each locating pocket of the flange and each locating pocket of the adapter plate has received a fastener therethrough and that is threadingly received by the second end of the bushings, then assembly is complete.

Unlike the process just described, in the prior art, specially manufactured shoulder bolts had to be used and the shoulder bolts acted as lever arms for the user trying to align the bolts with the bolt holes of the disc plate or mating flange. This prior art process resulted in very difficult assembly including trying to hammer the shoulder bolts into position or reaming the bolt holes in the flanges to a larger diameter.

The instant application addresses this problem because the threadless locating pockets of the mating flanges provide for ease of insertion of the bushing therein. With the bushing aligned with the locating pocket, fasteners can be threaded into the bushing pulling the bushing within the locating pocket to couple the disc pack to the mating flange. Moreover, the locating pockets allow the bushings to float freely maximizing the compressive force of the head of the bushings on the disc pack. Additionally, the heads of the bushings that are located in the clearance holes of the mating flange act as retention members also referred to as an anti-flail feature. Retention members keep the coupling assembly together in the event of disc pack failure and thus are an important safety feature of the coupling assembly according to the teachings of the instant invention.

Additionally, because the bushings are advantageously pulled into the locating pockets of the mating flanges, then greater pre-stretch can be obtained. That is, the bolt circle of the disc packs of the instant invention can increase from a first diameter in a first state, wherein the disc pack is not coupled to a mating flange, to a second diameter in a second state wherein the disc pack is coupled to a mating flange that is 0.37 percent to 0.74 percent greater than the first diameter. Therefore, the disc packs structurally provide a greater pre-stretch than has been heretofore known. In turn, the coupling assembly which includes the disc packs, centerpiece, adapter plates, and hub, according to the teachings of the invention, has improved runout and can withstand more torque than previously known. Moreover, the coupling of the disc pack to the mating flanges eliminates the need for a pilot ring or a pilot ring with coating because a transmission of the torque is no longer done by a friction connection, but by a fixed, mechanical connection as provided by the bushings and fasteners.

Once the adapter plates are coupled to the disk packs hub flanges are secured with fasteners to a hub mounting portion of the adapter plates to complete the coupling assembly.

In another embodiment a coupling assembly is provided without adapter plates such that hub flanges of the hubs are directly coupled to a respective disc pack. In this embodiment, the geometry of the hub flanges is the same as the adapter plates that were eliminated except each hub flange includes a hub, not present on the adapter plate and no hub mounting portion is present at the outer periphery of the hub flange. In the coupling assembly where the adapter plate is not present, there is a cost savings from the elimination of the adapter plate but some functionality is lost because collapse of the center member assembly is not available without the adapter plate.

In one aspect, the invention provides a disc pack that includes disc plates stacked together and define a first side of the disc pack and a second side of the disc pack. Bolt holes extend through the first side of the disc pack and the second side of the disc pack. A bolt circle is defined by the bolt holes. Bushings extend through the bolt holes. Each bushing of the bushings passes through a corresponding bolt hole. Each bushing includes a head at a first end of the bushing bearing against the first side of the disc pack. Each bushing includes a second end opposite the first end. The second end extends axially outside the bolt hole. A washer surrounds at least a portion of the second end and bears against the second side of the disc pack such that the washer holds the disc plates together. The disc pack is configured to increase from a first diameter defined by the bolt circle to a second diameter defined by the bolt circle that is at least 0.37% greater than the first diameter when the disc pack is pre-stretched.

By configured it is meant that the structural configuration of the disc plates that include the bolt holes with the bushings inserted therethrough with axial extensions provided by both the head of the bushing and the second end of the bushing that are received in locating pockets of a mating flange where the bushing is free to float therein permit a change in the diameter of the bolt circle, referred to as pre-stretch heretofore has been unknown. Moreover, because of the improved pre-stretch provided by the disc packs according to the teachings of the instant invention, the disc packs permit a coupling assembly to withstand higher torque and have improved runout while at the same time eliminating pilot rings and facilitating ease of assembly which reduces the amount of labor required and lost time in assembly.

In another aspect, the invention provides a centerpiece assembly for a coupling assembly. The centerpiece assembly includes a first flange at a first end of the centerpiece. The centerpiece assembly includes a second flange opposite the first flange at a second end of the centerpiece. The centerpiece assembly includes a first disc pack of stacked first disc plates. The first disc pack is coupled to the first flange. The centerpiece assembly includes a second disc pack of stacked second disc plates. The second disc pack is coupled to the second flange. Each one of the first disc pack and second disc pack include bolt holes extending from a first side to a second side and defining a bolt circle. Internally threaded bushings extend through a corresponding bolt hole. Each bushing includes a head at a first end of the bushing bearing against the first side and a body surrounded by the corresponding bolt hole. A second end opposite the first end and extends axially outside the corresponding one of the bolt holes. A washer surrounds at least a portion of the second end. The washer bears against the second side of the disc pack such that it holds the disc plates together.

In an embodiment, the bolt circle is configured to have a second diameter when assembled to a mating flange of the coupling assembly that is at least 0.74% greater than the first diameter.

In an embodiment, each one of the bushings is T-shaped. The head of each one of the bushings has an outermost diameter that is greater than a second diameter defined by the second end of each one of the bushings.

In an embodiment, each one of the bushings has internal threads extending an entire longitudinal length of the bushing.

In an embodiment, the head of each one of the bushings is sized to be a first locator for reception into a clearance hole of a mating flange.

In an embodiment, the second end of each one of the bushings has a circumferential chamfer.

In an embodiment, the second end of each one of the bushings is sized to be a second locater for reception into a locating pocket in a mating flange.

In an embodiment, a body extends between the first end of the bushing and the second end of the bushing. The body has an outermost body periphery that is circular and entirely surrounded by the bolt hole.

In an embodiment, a hex key is defined in each one of the heads or each one of the heads includes a hex head.

In an embodiment, the disc pack does not include pilot rings.

In an embodiment the second end of the bushing is not swaged.

In an embodiment, a first adapter plate is coupled to the first disc pack such that the first disc pack is located between the first adapter plate and the first flange. A second adapter plate is coupled to the second disc pack such that the second disc pack is located between the second adapter plate and the second flange.

In an embodiment, the centerpiece assembly includes fasteners threaded through a corresponding bushing to couple the first disc pack to the first flange, the second disc pack to the second flange, the first adapter plate to the first disc pack, and the second adapter plate to the second disc pack.

In an embodiment of the centerpiece assembly, each one of the first flange, the second flange, the first adapter plate, and the second adapter plate define a corresponding set of counterbores that define a corresponding bolt circle. Each one of the corresponding sets of counterbores are locating pockets having a first opening of a first locating diameter and a second opening opposite the first opening of a second locating diameter less than the first locating diameter. The corresponding set of counterbores are through holes evenly spaced apart from one another along the corresponding bolt circle.

In an embodiment, the second end of each bushing is at least partially surrounded by a corresponding one of the locating pockets.

In an embodiment, a portion of each one of the fasteners is surrounded by an unthreaded portion of a corresponding one of the corresponding set of counterbores of the second locating diameter.

In an embodiment, another portion of each one of the fasteners is threadingly received into the second end of a corresponding one of the bushings, the second end of the corresponding one of the bushings surrounded by the corresponding one of the corresponding sets of counterbores of the second locating diameter.

In an embodiment, the internal threads of the bushings extend an entire longitudinal length of the bushing. The outermost peripheral surfaces of the body and the second end of each of the bushings are circular and free of threads.

In an embodiment, each one of the first flange, the second flange, the first adapter plate, and the second adapter plate define a corresponding set of clearance holes that are through holes and that are evenly spaced apart and are located along the corresponding bolt circle. A corresponding clearance hole of the corresponding set of clearance holes surrounds at least partially the corresponding bushing head such that a retention member is defined by the corresponding head and the corresponding clearance hole.

In an embodiment, a coupling assembly includes the centerpiece assembly without adapter plates. A first hub having a first hub flange is mounted to the first disc pack. The first hub is configured to be mounted to a drive end of an apparatus. A second hub having a second hub flange is mounted to the second disc pack. The second hub flange is configured to be mounted to a driven end of a device.

In an embodiment, a coupling assembly includes the centerpiece assembly with the adapter plate. A first hub is mounted to the first adapter plate. The first hub is configured to be mounted to a drive end of an apparatus. A second hub is mounted to the second adapter plate. The second hub is configured to be mounted to a driven and of a device.

In yet another aspect, the invention provides a method for assembling a centerpiece assembly. The method includes the steps of inserting bushings through bolt holes of a first set of stacked disc plates and a second set of stacked disc plates. The method includes securing the disc packs together by fitting a corresponding washer over a corresponding second end of each of a first set of the bushings in the first set of stacked disc plates. The method includes securing the disc packs together by fitting a corresponding washer over a corresponding second end of each of a second set of the bushings in the second set of stacked disc plates. The method includes locating the corresponding second end of the first set of the bushings in a corresponding first set of locating holes of first flange at a first end of a centerpiece. The method includes locating the corresponding second end of the second set of the bushings in a corresponding second set of locating holes of a second flange at a second end of the centerpiece opposite the first end. The method includes threading a first set of fasteners into the first set of the bushings to couple: the first flange of the centerpiece to the first disc pack. The method includes threading a second set of fasteners into the second set of the bushings to couple the second flange to the second disc pack.

In an embodiment, the method includes making a first set of clearance holes and a first set of counterbores in a first adapter plate. The method includes making a second set of clearance holes and a second set of counterbores in a second adapter plate. The method includes locating the corresponding second end of the first set of bushings in a corresponding one of the first set of counterbores. The method includes locating the corresponding second end the second set of bushing in a corresponding one of the second set of counterbores. The method includes locating a corresponding first head of the first set of the bushings in a corresponding first clearance hole of the first set of clearance holes. The method includes locating a corresponding second head of the second set of the bushings in a corresponding second clearance hole of the second set of clearance holes.

In an embodiment, the method includes the step of pushing a third set of fasteners through a first portion of corresponding one of the first set of counterbores. The method includes the step of threading the third set of fasteners into the corresponding second end of the first set of the bushings to pull the corresponding second end of the first set of the bushings into a first locating pocket of a corresponding one of the first set of counterbores. The method includes the step of pushing a fourth set of fasteners through a first portion of a corresponding one of the second set of counterbores. The method includes the step of threading the fourth set of fasteners into the corresponding second end of the second set of the bushings to pull the corresponding second end of the second set of the bushings into a first locating pocket of a corresponding one of the second set of counterbores.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
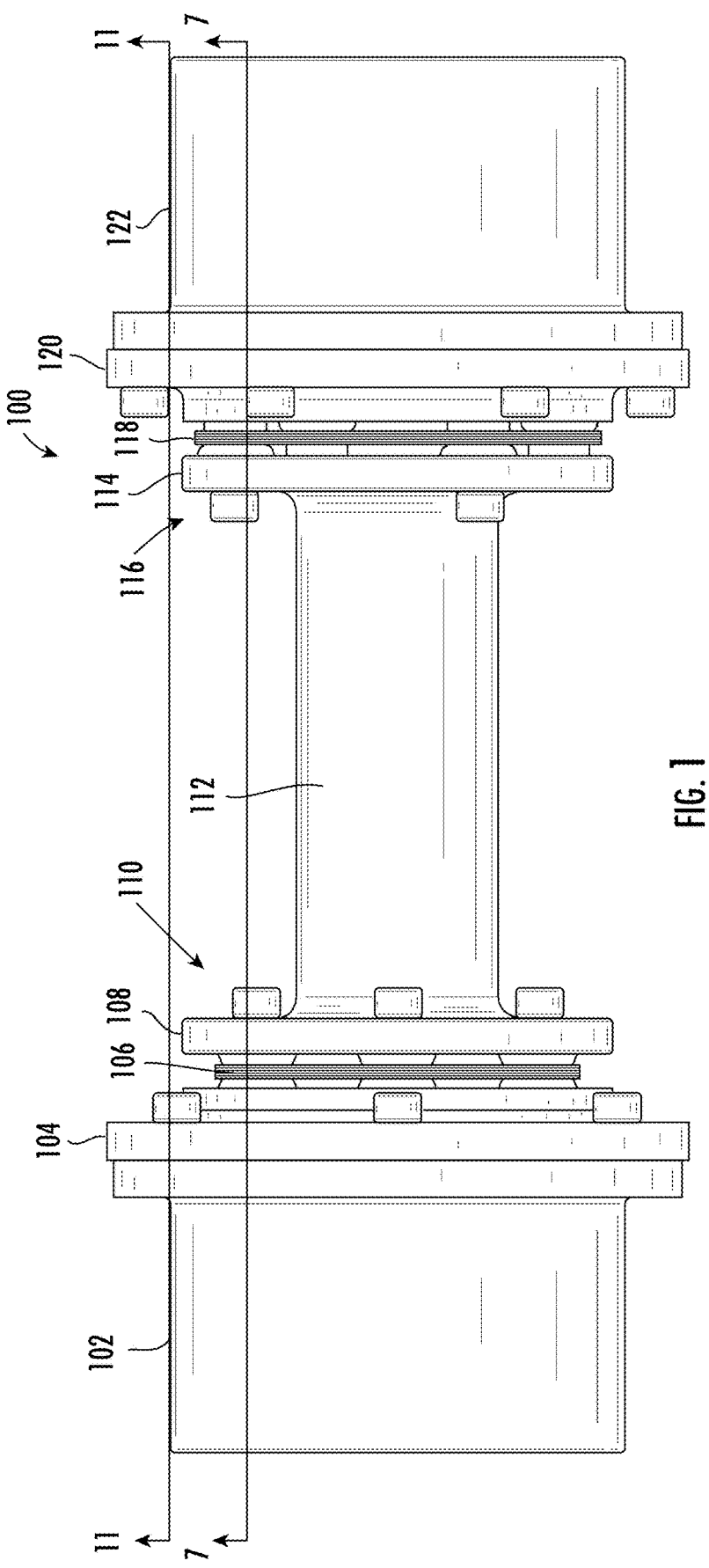
FIG. 1 is an isometric view of a coupling assembly according to the teachings of the instant application.

FIG. 1 illustrates a coupling assembly 100 for coupling a power source to a driven end, for example a gear box. The coupling assembly 100 of the instant invention eliminates structural components of the prior art, e.g., pilot rings and coatings thereon. Further, the coupling assembly 100 provides a greater range of pre-stretch, easier assembly, improved runout, and can withstand a higher torque force before failure than coupling assemblies heretofore known.

The coupling assembly 100 includes a first hub 102 coupled to a first adapter plate 104. The first adapter plate 104 is coupled to a first disc pack 106 which is coupled to first flange 108 at a first end 110 of a centerpiece 112. A second flange 114 at a second end 116 of the centerpiece 112 is coupled to a second disc pack 118. The second disc pack 118 is coupled to a second adapter plate 120 which is coupled to a second hub 122.

Figure 2:
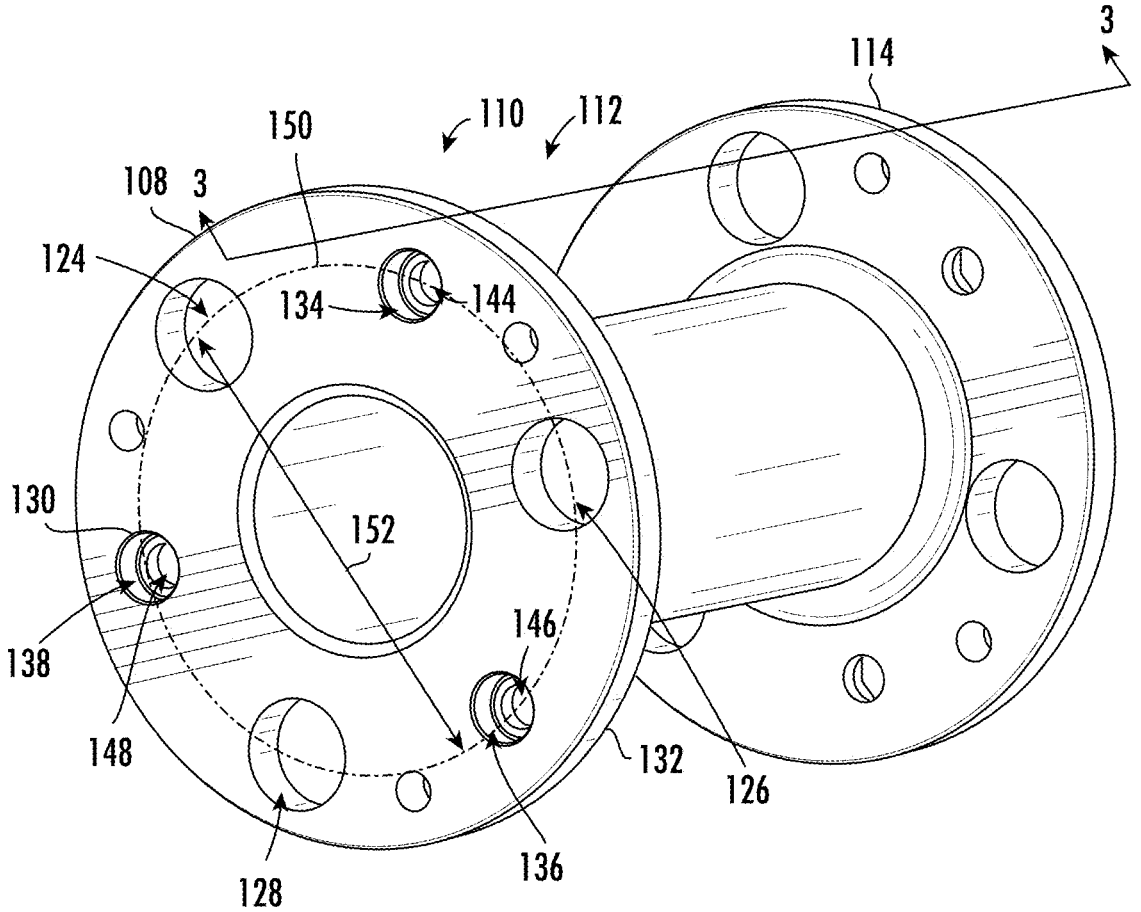
FIG. 2 is an isometric view of the centerpiece of the coupling assembly of FIG. 1.
Figure 3:
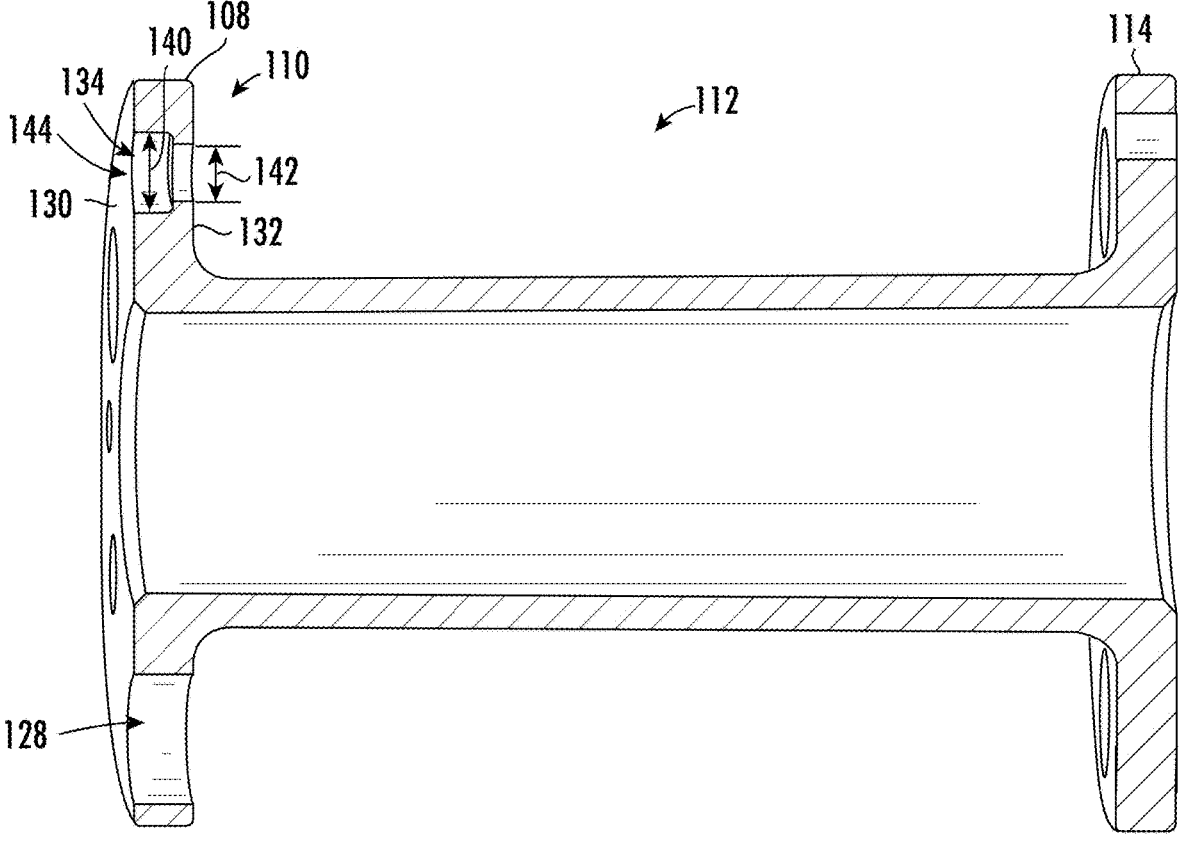
FIG. 3 is a cross section taken about line 3-3 of the centerpiece of FIG. 2.

Turning to FIG. 2, the centerpiece 112 is illustrated with the first flange 108 at the first end 110. FIG. 3 illustrates a partial cross section of the centerpiece 112. With respect to FIGS. 2 and 3, first flange 108 is structurally the same as second flange 114, and therefore only first flange 108 will be described. First flange 108 includes clearance holes 124, 126, 128, that are unthreaded through holes evenly spaced apart from one another. By through holes, it is meant they are not blind holes but instead extend completing through outward axially facing side 130 and inward axially facing side 132. As can be readily appreciated, a larger centerpiece 112 may include more than the three clearance holes 124, 126, 128 to accommodate the larger first flange 108.

First flange 108 includes cylindrical counterbore holes 134, 136, 138, that are through holes and that are evenly spaced apart from one another. Each counterbore hole 134, 136, 138 has a first portion of a first diameter 140 that is larger than a second diameter 142 defined by a second portion. The first portion of the counterbore holes are locating pockets 144, 146, 148.

A bolt circle 150 is defined by a circle extending through the center of each of the clearance holes 124, 126, 128 and counterbore holes 134, 136, 138. The bolt circle 150 of the first flange 108 has a diameter 152.

Figure 4:
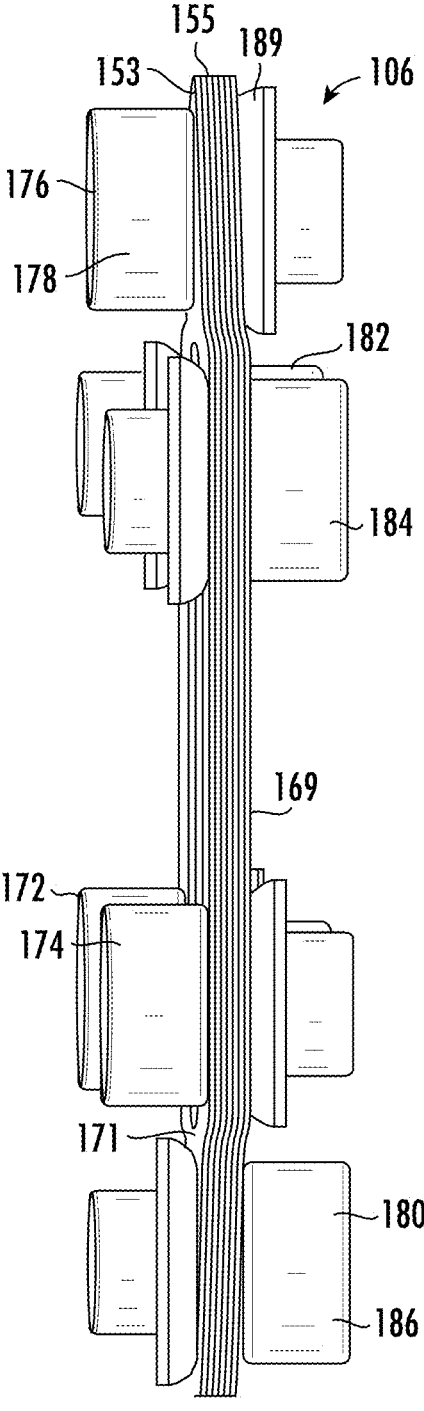
FIG. 4 is an isometric view of a disc pack of the coupling assembly of FIG. 1.
Figure 5:
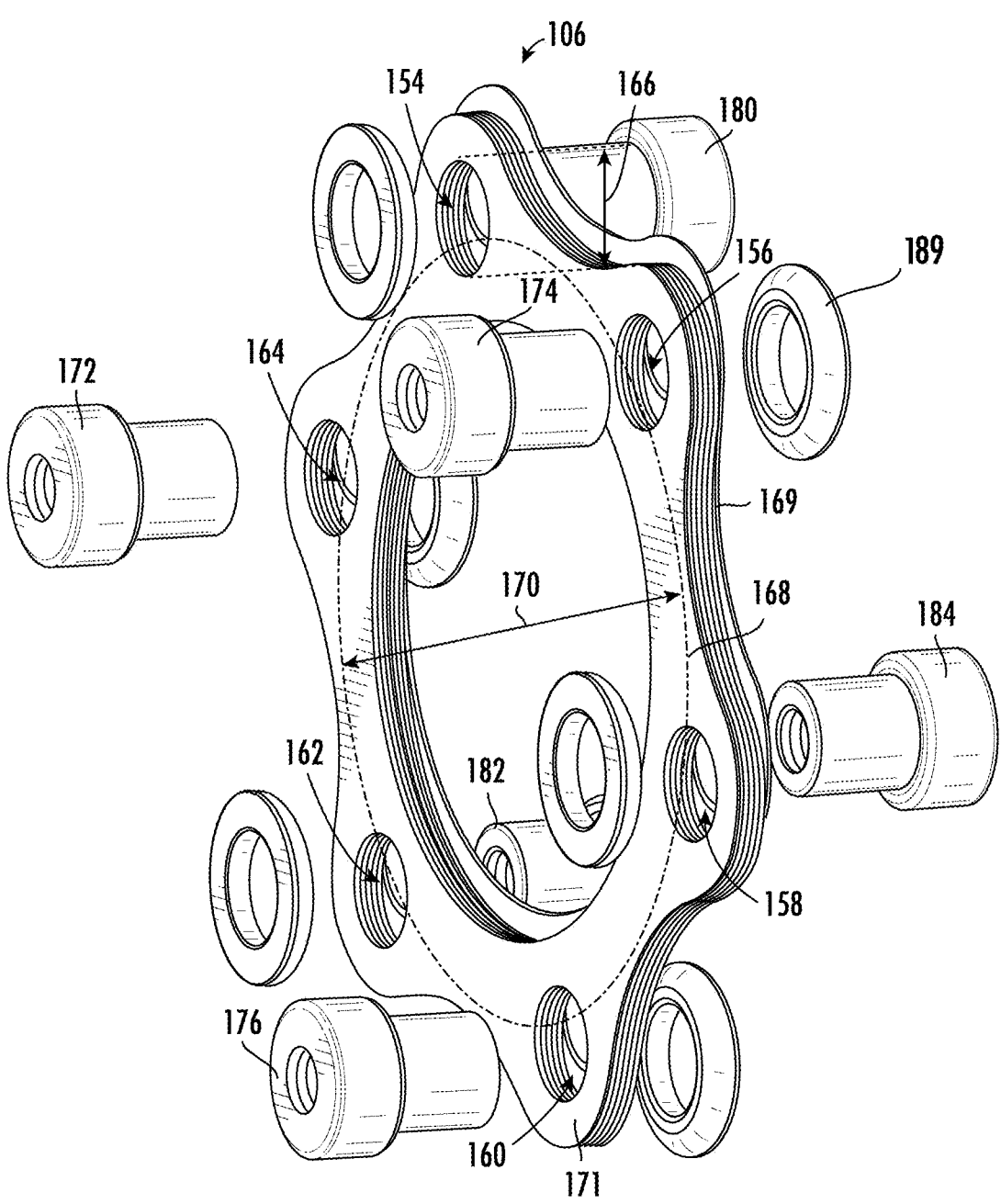
FIG. 5 is an exploded view of the disc pack of FIG. 4.

FIG. 4 illustrates the first disc pack 106. FIG. 5 illustrates an exploded view of the first disc pack 106. Second disc pack 118 (FIG. 1) is structurally the same as first disc pack 106 and therefore only first disc pack 106 will be described. With reference to FIGS. 4 and 5, disc pack 106 includes at least two disc plates 153, 155 and typically more are stacked together with axial faces abutting one another. The disc pack 106 includes bolt holes 154, 156, 158, 160, 162, 164, each having a same diameter 166. Bolt holes 154, 156, 158, 160, 162, 164, are through holes evenly spaced apart from one another. A circle extending through the centers of each of the bolt holes 154, 156, 158, 160, 162, 164 defines a bolt circle 168 that has a diameter 170 that is less than the diameter 152 (FIG. 2) of bolt circle 150 (FIG. 2) of the first flange 106 (FIG. 2). As previously discussed, the difference in the pre-determined bolt hole diameters 150, 172 permits the first disc pack 106 to be placed in pre-stretch when assembled to the first adapter plate 104 (FIG. 1).

The bolt holes 154, 156, 158, 160, 162, 164, extend through inward axially facing side 169 and outward axially facing side 171 of the disc pack 106. A first set bushings 172, 174, 176, extend in a first orientation, that is, they extend in a first direction through three of the bolt holes 154, 156, 158, 160, 162, 164. By first orientation, it is meant the first set of bushings 172, 174, 176, have a head 178 bearing against the outwardly axially facing side 171 of the first disc pack 106.

A second set of bushings 180, 182, 184, are structurally the same as the first set of bushing 172, 174, 176. However, the second set of bushings 180, 182, 184 extend in second orientation that is a second direction which is 180 degrees opposite the first orientation and the first direction through three of the bolt holes 154, 156, 158, 160, 162. The second set of bushings 180, 182, 184 each have a head 186 bearing against an inward axially facing side 169 of the first disc pack 106. A washer 189 is placed over, and may be press fit over, each one of the first set of bushings 172, 174, 176, and the second set of bushings 180, 182, 184 such that the disc plates 153, 155 of the first disc pack 106 are secured between the heads 178 of the first set of bushings 172, 174, 176, and washers 189 and between the heads 186 of the second set of bushings and the washers 189.

Figure 6:
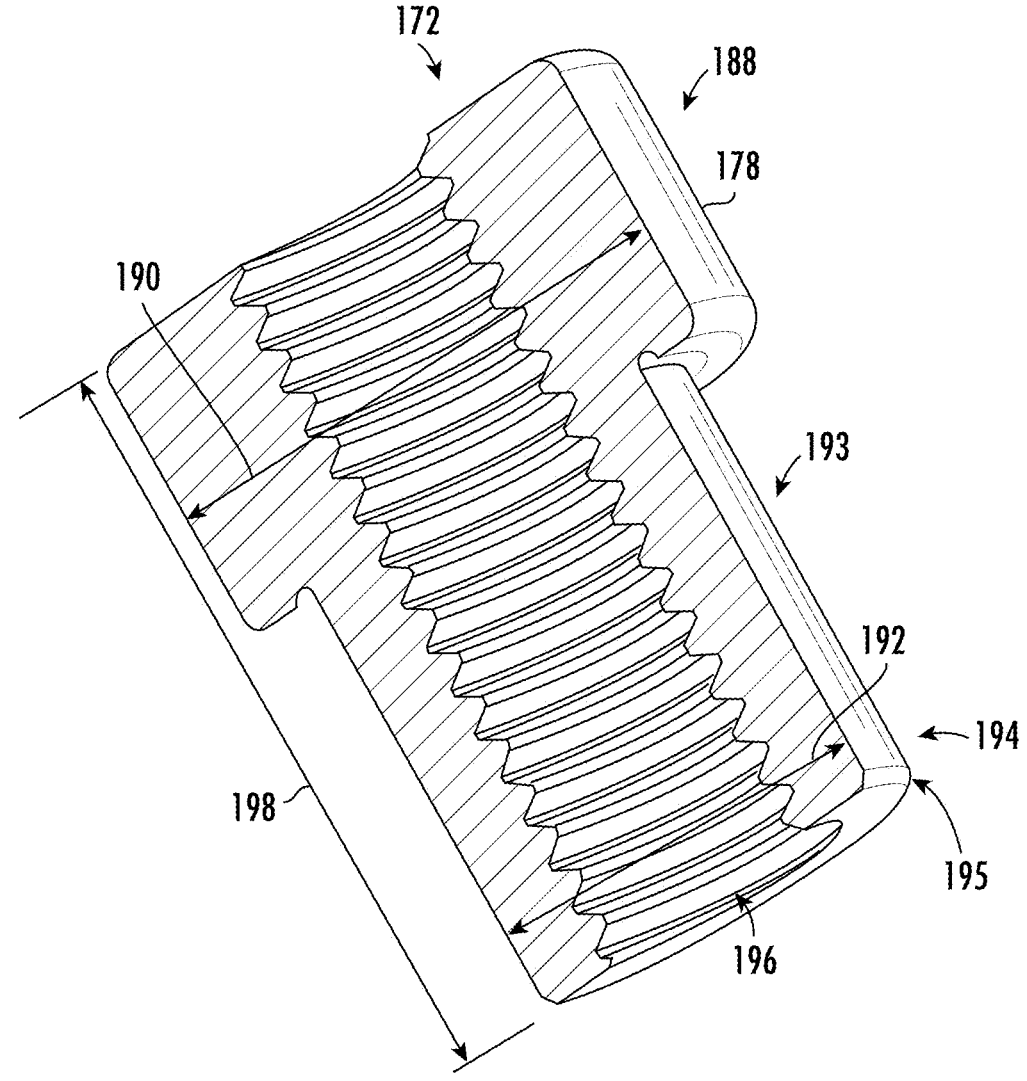
FIG. 6 is a cross section of a bushing of the coupling assembly of FIG. 1.

FIG. 6 illustrates a cross section of the bushing 172, which is representative of the first set of bushings 172, 174, 176 (FIG. 4) and the second set of bushings 180, 182, 184 (FIG. 4) which are all structurally the same. Bushing 172 is T-shaped. Bushing 172 has a first end 188, a second end 194 and a body 193 between the first end 188 and the second end 193. The body 193 is completely surrounded by a bolt hole 154, 156, 158, 160, 162, 164 (FIG. 5) of the first disc pack 106 (FIG. 4).

Figure 8:
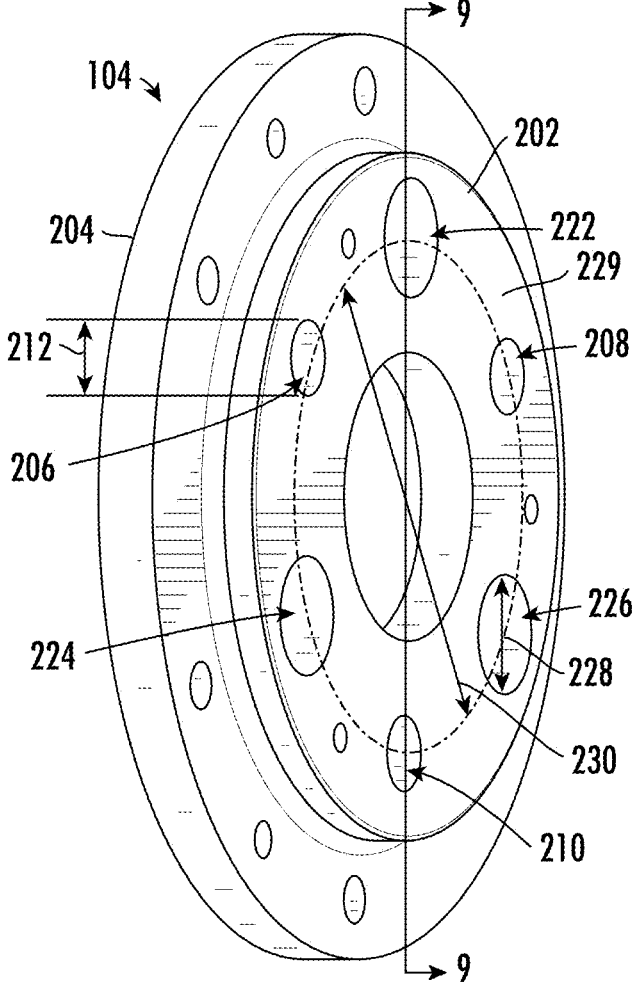
FIG. 8 is an isometric view of an adapter plate of the coupling assembly of FIG. 1.

The first end 188 defines the head 178 of the bushing 172 and defines a diameter 190 that is greater than a diameter 192 at a second end 194 of the bushing 172 such that the second end of the bushing 194 can be inserted through any one of the bolt holes 154, 156, 158, 160, 162, 164 (FIG. 5) until the head 178 which acts as a stop, preventing further insertion. The second end of the bushings is an axially extending second end, because when inserted in the bolt holes 154, 156, 158, 160, 162, 164, it is located axially outside the bolt holes 154, 156, 158, 160, 162, 164 (FIG. 5) to receive the washer 189 (FIG. 4) and to allow second end 194 to be a locating portion that locates and is received into locating pockets 144, 146, 148, (FIG. 2) and locating pockets 206, 208, 210 (FIG. 8).

The bushing 172 defines internal threads 196 extending the entire longitudinal length 198 of a through hole through the center of the bushing 172. The second end 194 of the bushing has a circumferential chamfer 195 to facilitate the second end 194 acting as a lever arm and locating arm for insertion into a locating pocket 144, 146, 148, (FIG. 2) and locating pockets 206, 208, 210 (FIG. 8). The outermost peripheral surfaces of the bushing are entirely circular which facilitates ease of assembly without the interference of a keyed feature on the outermost periphery.

Figure 7:
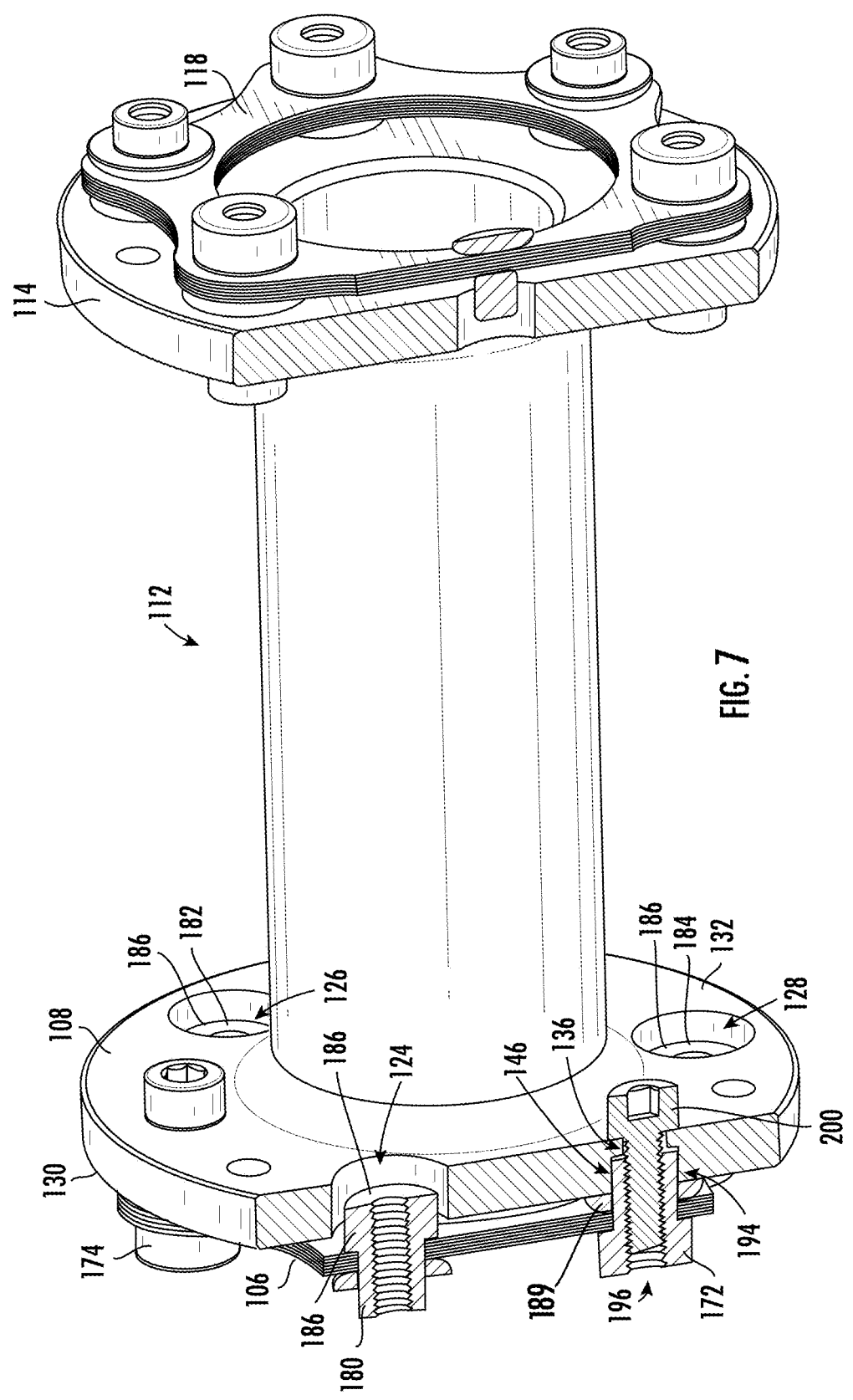
FIG. 7 is a cross section taken about line 7-7 of the coupling assembly of FIG. 1.

Having discussed the centerpiece 112 (FIG. 2) and the first disc pack 106 (FIG. 4), as well as the structure of the bushings 154 (FIG. 6) it can now be readily appreciated how the first disc pack 106 (FIG. 3) is coupled to the centerpiece 112 (FIG. 7).

Turning then to FIG. 7, a partial cross section of the first flange 108 of the centerpiece 112 is shown coupled to the first disc pack 106. The coupling of the second disc pack 118 to the second flange 114 is done in the same manner and therefore, only the coupling of the first disc pack 106 to the first flange 108 will be described.

The disc pack 106 is placed over the outward axially facing side 130 of the first flange 108 such that the clearance holes 124, 126, 128 of the first flange 108 align with and may at least partially receive the heads 186 of the second set of bushings 180, 182, 184 facing the first flange 108. This placement in turn assists in positioning the internal threads 196 at the second end 194 of the first set of bushings 172, 174, 176 (FIG. 5), proximate and/or partially in the locating pocket 144 (FIG. 2), 146, 148 (FIG. 2) of the first flange 108.

The threaded end of a fastener 200, for example a cap screw or bolt 308 (FIG. 13) is inserted through the threadless locating pockets 144, and 146 (FIG. 2), 148 (FIG. 2) in the direction from the inward axially facing side 132 toward the outward axially facing side 130. Once inserted through the locating pockets 144 (FIG. 2), 146, 148 (FIG. 2), the threaded end of the fastener 200 will meet the internal threads 196 of the second end 194 of the first set of bushings 172, 174 and 176 (FIG. 5) extending from the first disc pack 106 and facing the locating pockets 144 (FIG. 2), and 146, 148 (FIG. 2). The second end 194 of the first set of bushings 172, 174 and 176 (FIG. 5) on the first disc pack 106 threadingly receive the threaded end of the fasteners 200.

Figure 15:
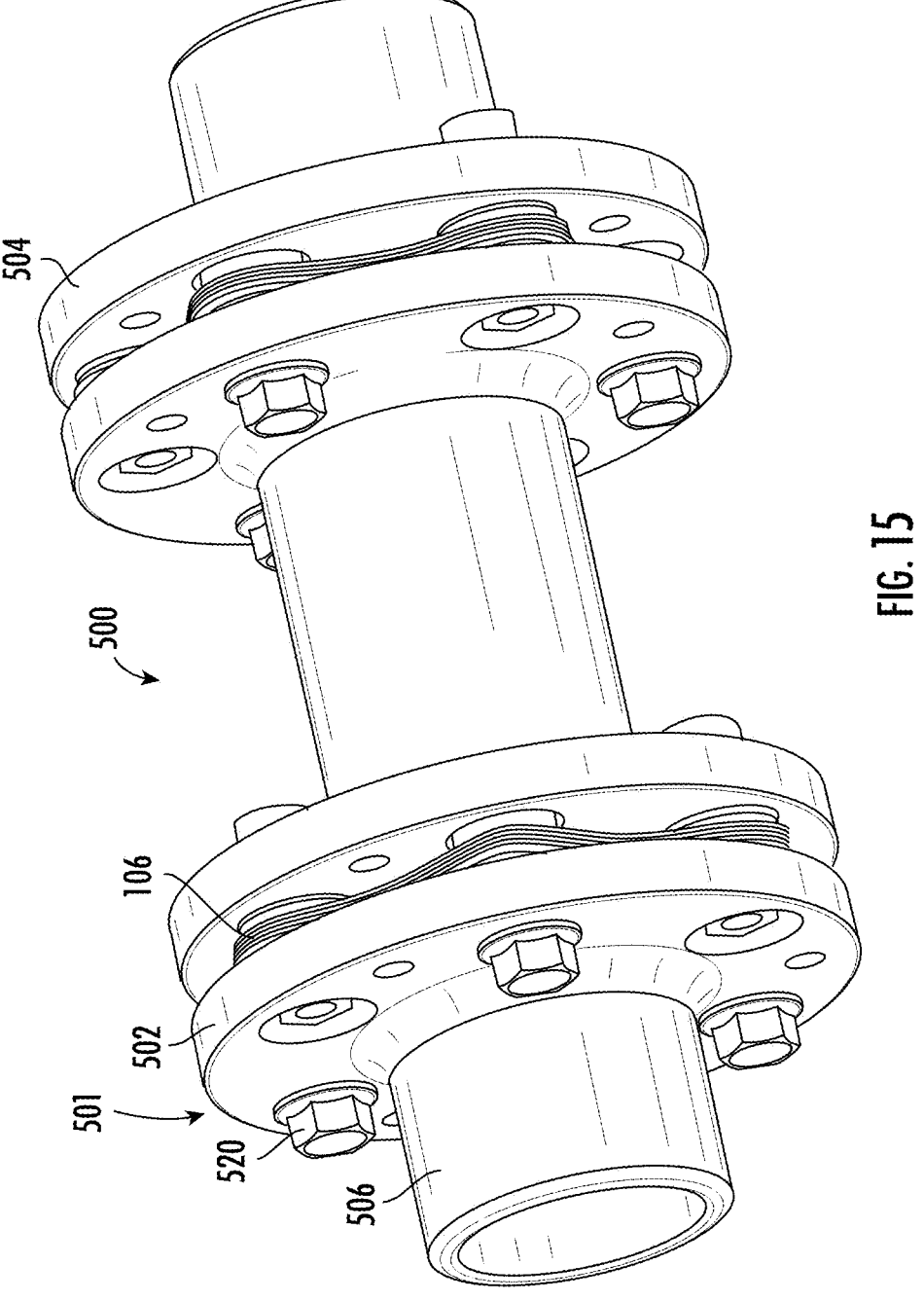
FIG. 15, is an isometric view of another embodiment of a coupling assembly according to the teachings of the invention.

Still with respect to FIG. 7, as the threaded end of the fastener 200 is threaded into the internal thread 196, the first set of bushings 172, 174 and 176 (FIG. 5) are pulled into the locating pockets 144 (FIG. 2), 146, 148 (FIG. 2). The countersunk holes 134, 136, 138 (FIG. 2) allow the bushings 172, 174, 176 (FIG. 5) to float freely, maximizing the compressive force of the head 186 of the bushings 172, 174, 176 on the first disc pack 106 (FIG. 1). This coupling creates a pre-stretch in the first disc pack 106 such that the diameter 170 (FIG. 5) of bolt circle 168 (FIG. 5) of the first disc pack 106 increases to equal the diameter 152 (FIG. 2) of first bolt circle 150 (FIG. 2) of the first flange 108. For example, it has been found that a bolt circle having a diameter of 2.714 inches (a first diameter) may increase between 0.37% and 0.74% in diameter (a second diameter) when coupled to a mating flange, e.g., the first flange 108 (FIG. 1) or the first adapter plate 104 (FIG. 1) or a first hub flange 502 (FIG. 15).

This advantageously allows for the disc pack 106 to fit with more mating flanges of varying bolt hole diameters while providing increased pre-stretch as compared to the disc packs heretofore known. The same foregoing steps are repeated for assembling the second disc pack 118 to the second flange 114 of the centerpiece 112.

This means of assembly is a significant improvement over the prior art where specialty bolts had to be pushed or hammered through the flange of the centerpiece and the bolt holes of the disc pack to assemble the coupling.

Figure 9:
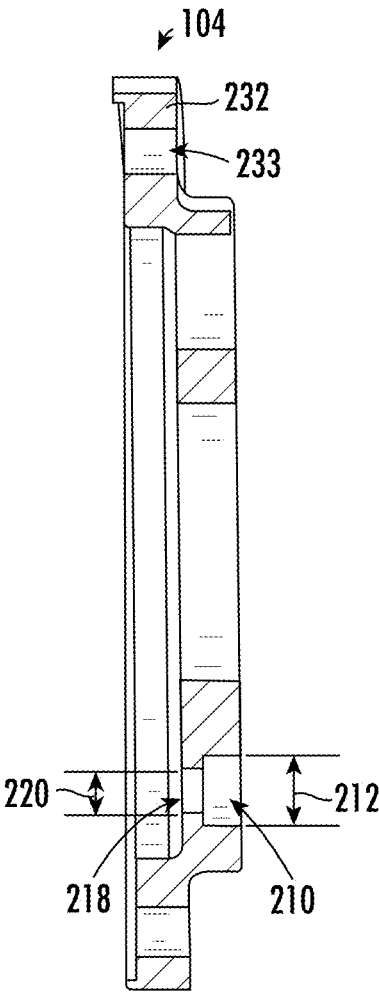
FIG. 9 is a cross section taken about line 9-9 of the coupling assembly of FIG. 8.

Turning now to FIG. 8, the first adapter plate 104 is illustrated while FIG. 9 illustrates a cross section of the first adapter plate 104. With reference to FIGS. 8 and 9, the first adapter plate 104 has an inward axially facing side 202 that is coupled to the first disc pack 106 (FIG. 1) and an outward axially facing side 204 that is coupled to the first hub 102 (FIG. 1). The second adapter plate 120 (FIG. 1) is structurally the same as the first adapter plate 104, and therefore only the first adapter plate 104 will be described.

The first adapter plate 104 includes threadless counterbore through holes 206, 208, 210 having a first portion of a first diameter 212 that is a locating pocket and a second portion of a second diameter 220 that is less than the first diameter 212. The countersunk holes 206, 208, 210 allow a bushing 172 (FIG. 6) to float freely maximizing the compressive force of the head 188 (FIG. 6) of the first set of bushings 172 (FIG. 7), 174 (FIG. 7), 176 (FIG. 5) on the first disc pack 106 (FIG. 5).

The first adapter plate 104 also includes threadless clearance holes 222, 224, 226, all of the same diameter 228 which receive the heads 188 (FIG. 6) of the first set of bushings 172 (FIG. 7), 174 (FIG. 7), 176 (FIG. 5) on the first disc pack 106 (FIG. 5).

A circle drawn through the center of each countersunk hole 206, 208, 210 and the center of each clearance hole 222, 224, 226 defines a bolt circle 229 having a diameter 230 that is greater than the diameter 170 (FIG. 5) of the bolt circle 168 (FIG. 5) and the same as the diameter 152 (FIG. 2) of bolt circle 150 (FIG. 2) of the first flange 108 (FIG. 2). The first adapter plate 104 also includes a hub mounting portion 232 having evenly spaced threadless through holes 233 extending circumferentially around the hub mounting portion 232.

Figure 10:
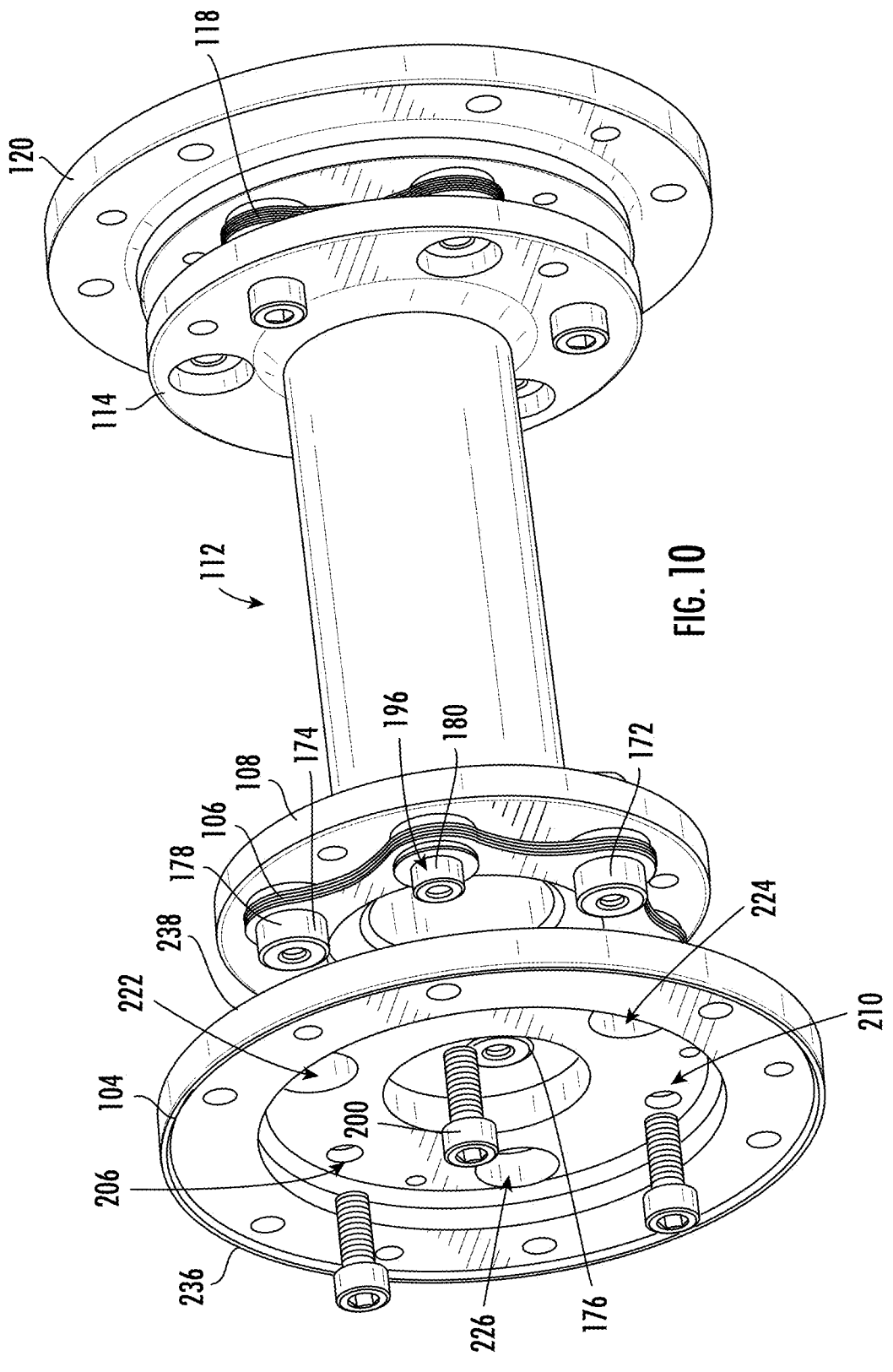
FIG. 10 is a partial assembly view of an adapter plate coupled to a disc pack coupled to the centerpiece of FIG. 2.

Turning now to FIG. 10, once the centerpiece 112 has both disc packs 106, 118 securely coupled to its first flange 108 and the second flange 114, the first adapter plate 104 and the second adapter plate 120 can be coupled to the respective first disc pack 106 and the second disc pack 118. The assembly is the same as that which was described with respect to the assembly of the first disc pack 106 with the first flange 108.

The first adapter plate 104 is placed over the first disc pack 106 such that the clearance holes 222, 224, 226, of the first adapter plate 104 align with and may at least partially receive the heads 178 of the first set of bushings 172, 174, 176 facing the adapter plate 104. This placement in turn assists in positioning the internal threads 196 of the second set of bushing at the second end of the second set of bushings 180, 182 (FIG. 7), 184 (FIG. 7) in alignment with the locating pockets 206, 208, 210 of the first adapter plate 104.

Next, as was described with respect to the assembly of the first disc pack 106 to the first flange 108, according to the teachings of the instant invention, the threaded end of a fastener 200 is inserted through the threadless locating pockets 206, 208, 210 (FIG. 8), in the direction from the outward axially facing side 236 of the first adapter plate 104 toward the inward axially facing side 238 of the first adapter plate 104.

Once the fasteners 200 are inserted through the locating pockets 206, 208 (FIG. 8), 210, the threaded end of the fasteners 200 meets with and is threaded into the internal threads 196 of the second end of the second set of bushings 180, 182 (FIG. 7), 184 (FIG. 7) extending from the first disc pack 106 and facing the locating pockets 206, 208 (FIG. 8), 210 of the first adapter plate 104. As the fasteners 200 are threaded into the internal threads 196 of the second set of bushings 180, 182 (FIG. 5), 184 (FIG. 5). Each one of the second set of bushings 180, 182 (FIG. 5), 184 (FIG. 5) is pulled into a corresponding one of the locating pockets 206, 208 (FIG. 8), 210.

Once coupled to the first adapter plate 104, the bolt circle diameter 170 (FIG. 5) of the first disc pack 106 is the same as the bolt circle diameter 152 (FIG. 2) of the first flange 108 which is equal to the bolt circle diameter 230 (FIG. 8) of the first adapter plate 104. The same foregoing steps are repeated for assembling the second adapter plate 120 to the second disc pack 118.

Figure 11:
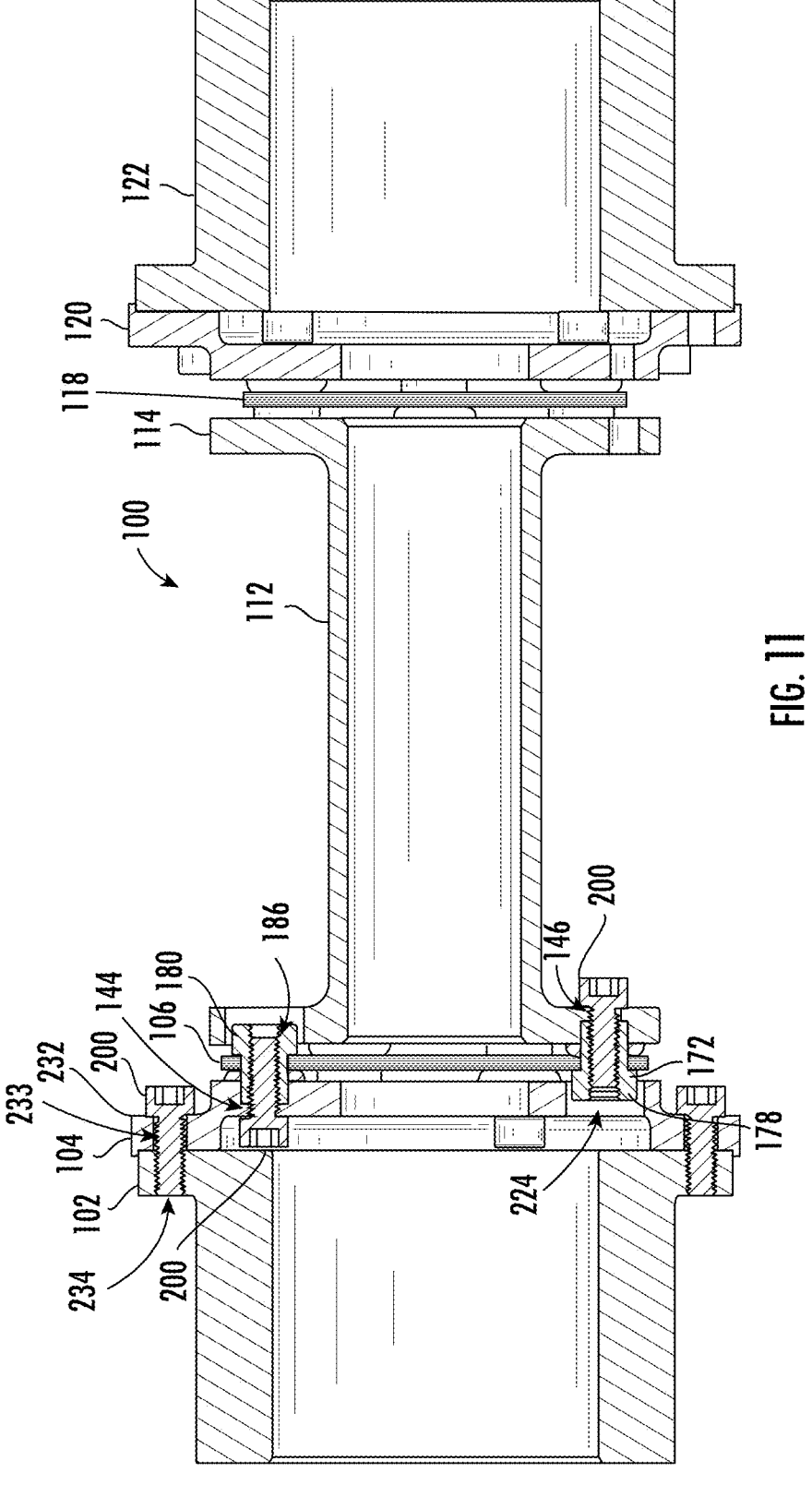
FIG. 11 is a cross section taken about line 11-11 of the coupling assembly of FIG. 1.

Turning to FIG. 11, a cross section of the coupling assembly 100 is shown. Centerpiece 112 is coupled to the first disc pack 106 which is coupled to the first adapter plate 104. The first hub 102 is coupled to the first adapter plate 104 with fasteners 200 that extend through the through holes 233 of the first hub mounting portion 232 and through holes 234 of the first 102. So too, the second flange 114 of the centerpiece 112 coupled to the second disc pack 118 which is coupled to the second adapter plate 120. The second adapter plate 120 is coupled with fasteners 200 to the second hub 122.

Bushing 180 is shown with its second end 194 (FIG. 6) abutting locating pocket 144 as a result of fastener 200 having been inserted into the locating pocket 144 and threaded into the bushing 180 to pull the first disc pack 106 into alignment such that head 186 of the bushing 180 bears against the disc pack 106 providing a compression force between the locating pocket 144 and the head 186. Bushing 172 is shown with its head 178 partially inside of clearance hole 224 as a retention member. One of the fasteners 200 has been inserted into locating pocket 146 and threaded into the bushing 172 so that the first disc pack 106 is pulled into alignment via the bushing 172 and a compression force created between the head 178 of the bushing 172 and the locating pocket 146.

Figure 12:
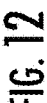
FIG. 12 is a graph illustrating comparative test results on the angle of deflection of the coupling assembly of FIG. 1 versus torque applied to the coupling assembly.

Turning now to FIG. 12 and with reference to FIG. 1, the same depicts test results measuring the angle of deflection of first hub 102 (FIG. 1) relative to second hub 122 (FIG. 1) within a plane normal to the longitudinal axis of coupling assembly 100 (FIG. 1) when a torque is applied to coupling assembly 100 (FIG. 1). As can be seen from the graph, four tests were conducted.

The first test was relative to the prior art coupling assembly described in the '152 patent without any coating on its pilot rings and its results are indicated at plot line 240. The second test was relative to a prior art coupling assembly of the '152 patent having a nickel coating on its pilot rings and associated flanges and its results are indicated at plot line 242. The third test was done using a prior art coupling assembly of the '152 patent having a tungsten carbide cobalt coating on its pilot rings and flange surfaces and its results are indicated at plot line 244.

As can be seen from plot line 240, once a torque of approximately 3,500 in-lbs was reached, a significant increase in the angle of deflection of first hub relative to second hub occurred, i.e., the uncoated coupling assembly entered a slip condition. Such a slip condition is highly undesirable as it places the fasteners of coupling assembly in a shear stress state. As can be seen from plot line 242, once a torque of approximately 7,250 in-lbs was reached, a significant increase in the angle of deflection of first hub relative to second hub occurred, i.e., the nickel coated coupling assembly entered a slip condition. Unlike the uncoated prior coupling assembly, this nickel coated coupling assembly as can be seen from plot line 244, a torque of approximately 9500 in-lbs caused a failure of the coupling assembly without any slip. It predictably failed under a given maximum loading condition.

The fourth test was conducted on the coupling assembly 100 (FIG. 1) of the instant invention. As seen by plot line 246, no failure was experienced by the coupling at torque of 15,000 in-lbs well above any of the prior art coupling assemblies tested. The results and torque capacity of the coupling assembly 100 (FIG. 1) was not expected to be of such a magnitude. Indeed, the test was stopped before failure occurred, as understood by those skilled in the art, should more torque been applied, the failure would have been so extreme as to possibly cause injury to those performing the test. It is suspected that the weakness in the coupling assembly is likely the strength of the fasteners used. The test results support that the structural configuration of the coupling assembly with the disc packs 106 (FIG. 1), 118 (FIG. 1), bushings, washers, locating pockets and clearance holes provide for a coupling assembly 100 (FIG. 1) with improved torque capability heretofore not known.

Figure 13:
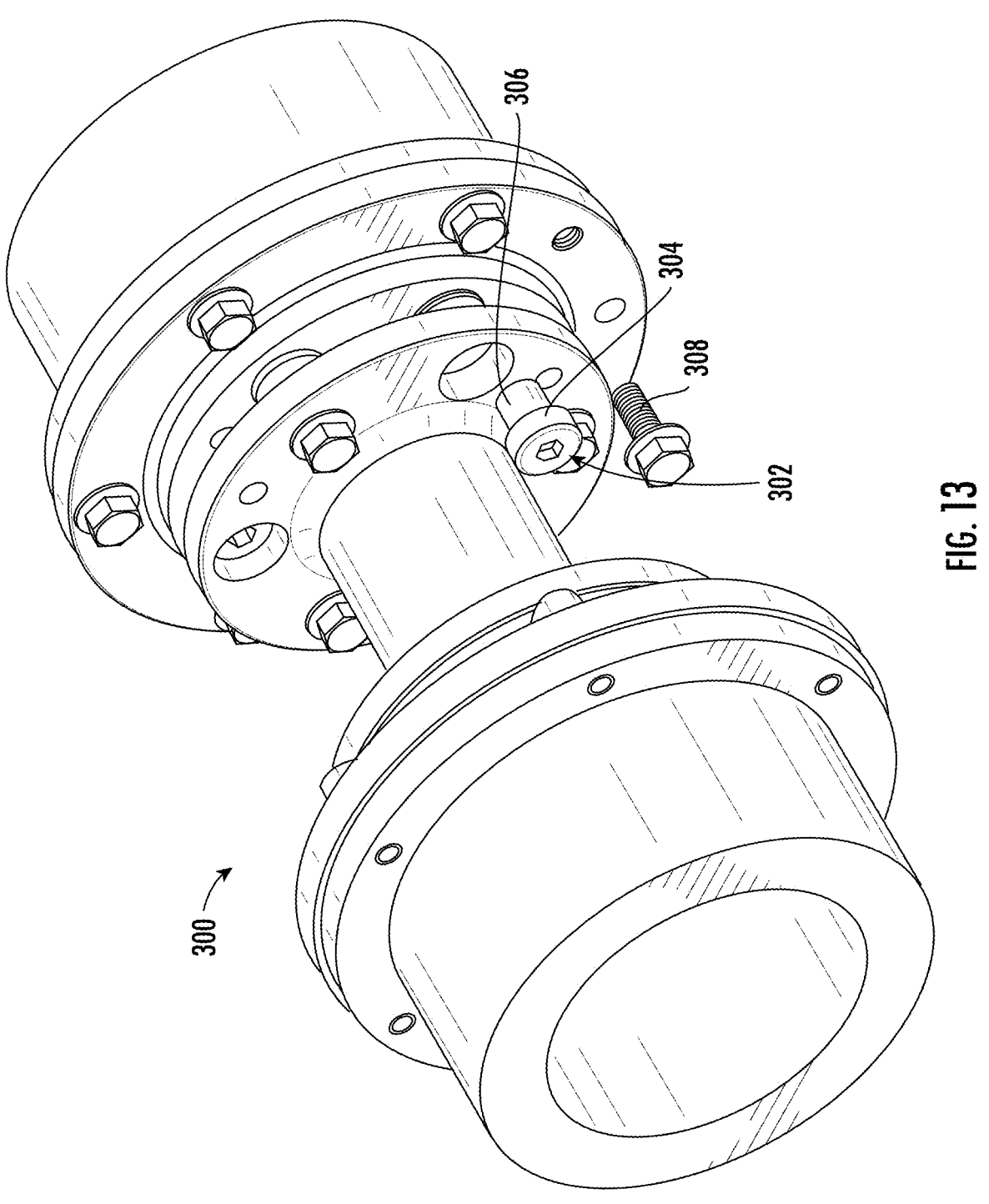
FIG. 13 is a partial assembly view of a second embodiment of a coupling assembly.

FIG. 13 illustrates an embodiment of a coupling assembly 300 which is the same as coupling assembly 100 (FIG. 1), except a hex key 302 is defined in each head 304 of a plurality of bushings 306. Each one of a plurality of fasteners 308 is a hex bolt. A corresponding one of the plurality of fasteners 308 is threaded into a corresponding one of the plurality of bushings 306 to couple the coupling assembly as described above with respect to coupling assembly 100 (FIG. 1). However, with the hex key 302 and the hex bolt 308 engaged with the cooperating tools therefor, then rotation of the bushing 306 can be prevented with the use of the appropriate tool in the hex key and the appropriate tool on the hex bolt 308. This may be useful, not only in assembly, but also in disassembly where there may be a distorted disc pack or possible corrosion present.

Figure 14:
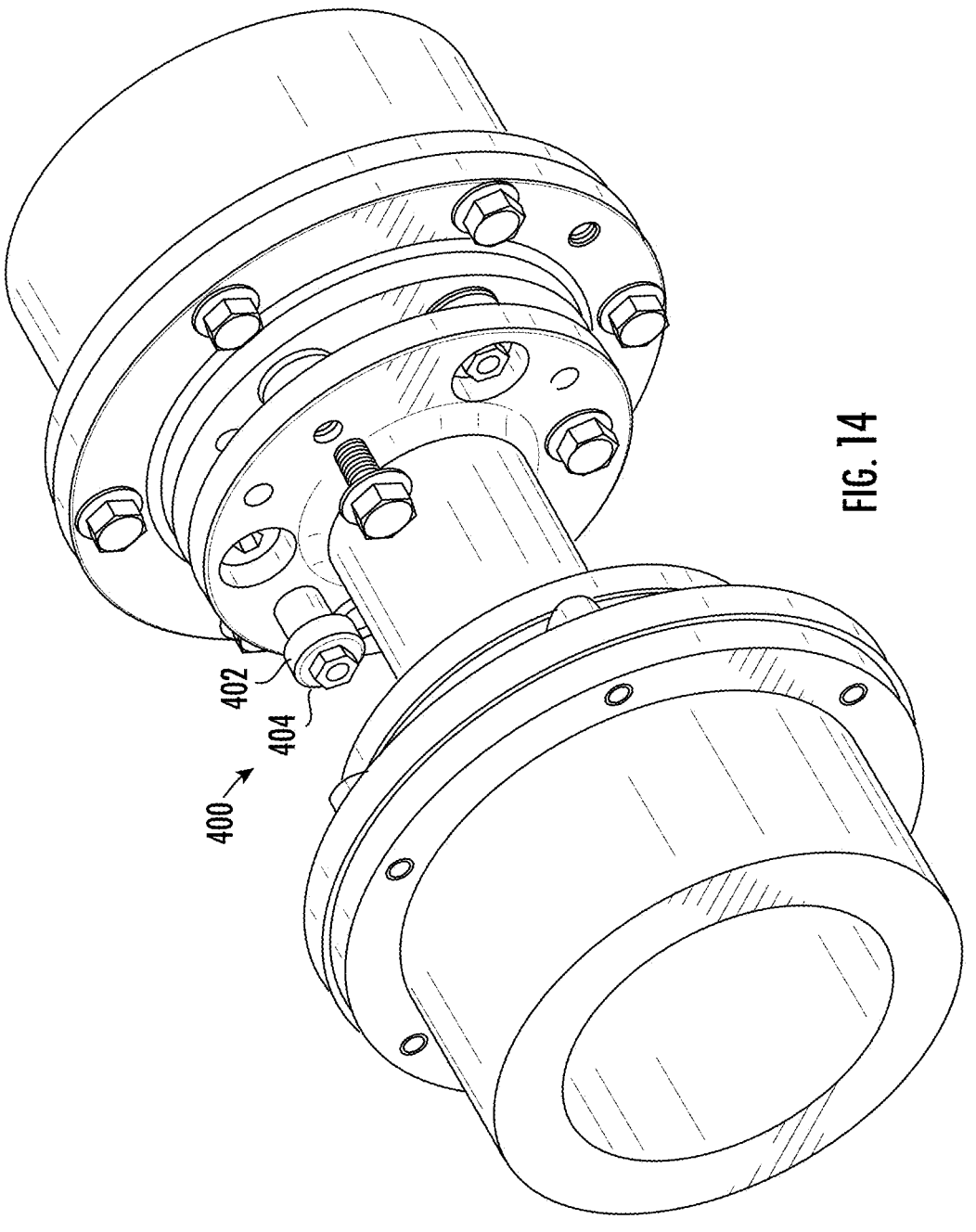
FIG. 14, is a partial assembly view of a third embodiment of a coupling assembly.

FIG. 14 illustrates yet another embodiment of a coupling assembly 400 which is the same as coupling assembly 300, except each one of the plurality of bushings 402 include a hex head 404. The hex head 404, as readily appreciated, allows a tool to be placed thereon to prevent rotation of the bushing 402 in the bolt hole during assembly and disassembly of the coupling assembly 400.

Figure 16:
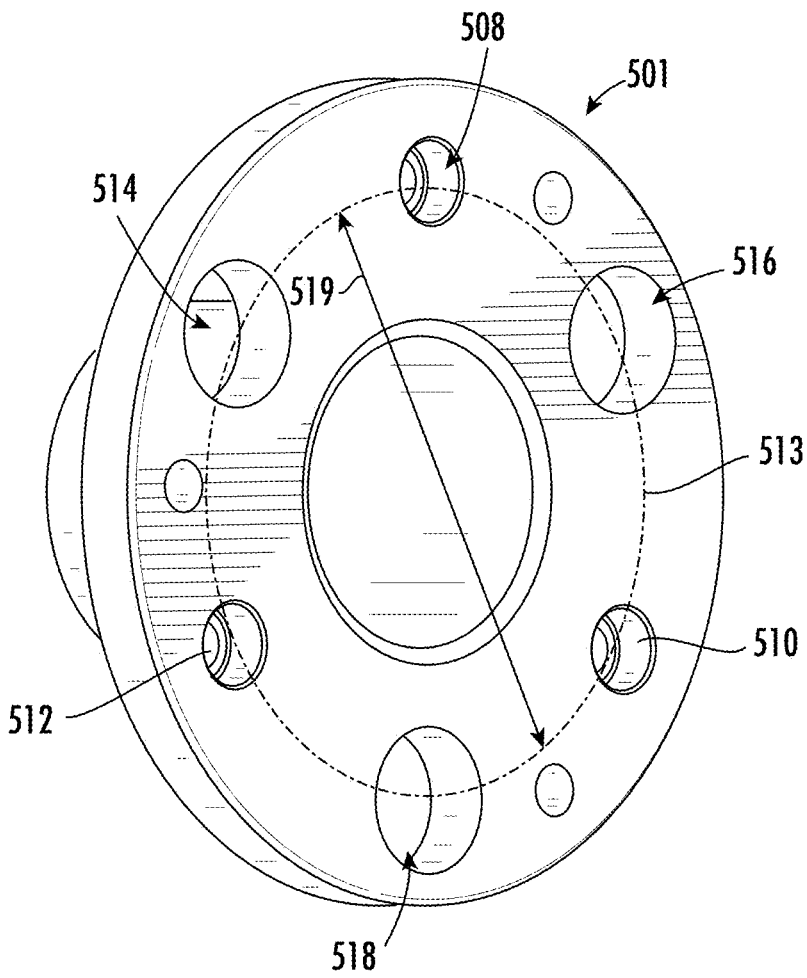
FIG. 16, is an isometric view of a hub of the coupling assembly of FIG. 15.
Figure 17:
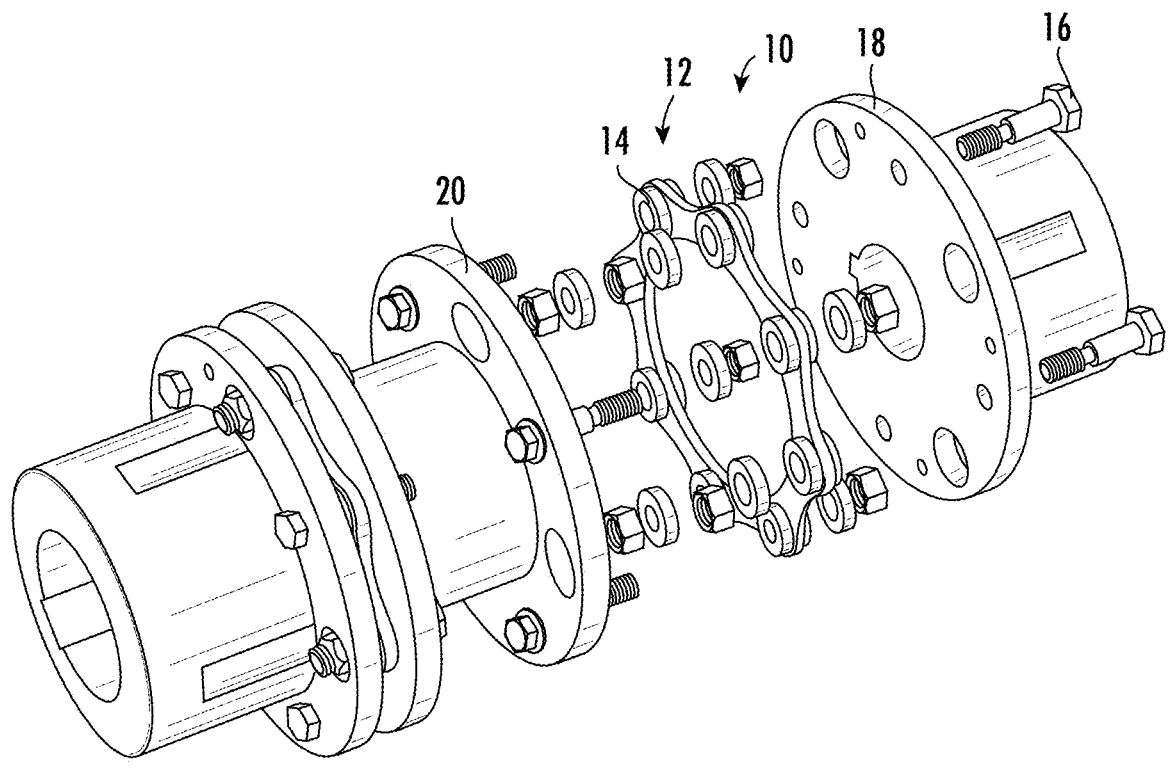
FIG. 17 is a partial assembly view of a PRIOR ART coupling assembly.

FIG. 15 illustrates a further embodiment of a coupling assembly 500 according to the teachings if the instant invention. FIG. 16 illustrates a first hub 501 including a first hub flange 502 of the coupling assembly 500 (FIG. 15). With respect to FIGS. 15 and 16, coupling assembly 500 is the same as coupling assembly 100 (FIG. 1) except that the first adapter plate 104 (FIG. 1) and the second adapter plate 120 (FIG. 1) are not used. Instead, the first disc pack 106 is coupled to the first hub flange 502 and the second hub flange 504. The geometry of the first hub flange 502 is the same as the first adapter plate 104 (FIG. 1) except first hub portion 506 is not present on the first adapter plate 104 (FIG. 1) nor does the first hub flange 502 include a hub mounting portion 232 (FIG. 9). The geometry of the second flange hub 504 is the same as the geometry of the first hub flange 502 and therefore only the first hub flange 502 will be described.

The first hub flange 502 includes a plurality of counterbores 508, 510, 512 which are of the same geometry of counterbores 134, 136, 138 (FIG. 2) and therefore will not be further described. The first hub flange 502 includes a plurality of clearance holes 514, 516, 518, of the same geometry as clearance holes 124, 126, 128 (FIG. 2) and therefore will not be further described. Bolt circle 513 is defined by the plurality of counterbores 508, 510, 512 and the plurality of clearance holes 514, 516, 518. A diameter 519 of the bolt circle 513 is larger than the diameter 170 (FIG. 5) of the bolt circle 168 (FIG. 5) of the first disc pack 106 (FIG. 5) so as to create pre-stretch in the disc pack 106 when coupled to the first hub flange 502. Coupling the first disc pack 106 to the first hub flange 504 involves the same process as was described above with respect to the first disc pack 106 to the first adapter plate 104. Coupling the first disc pack 106 to the first hub flange 504 can utilize any of the fasteners 200 (FIG. 7) including hex bolts 520 and bushings 172 (FIG. 6) or bushings 306 (FIG. 13) and bushings 404 (FIG. 14). Coupling assembly 500 and has been found to provide a pre-stretch to the disc pack 106 such that the first bolt circle diameter 170 (FIG. 5) increases to equal the bolt circle diameter 519 of the first hub flange 502. The increase is between 0.37% and 0.74% greater than the first bolt circle diameter 170 (FIG. 5).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A disc pack, comprising:

disc plates stacked together and defining a first side of the disc pack and a second side of the disc pack;

bolt holes extending through the first side of the disc pack and the second side of the disc pack;

a bolt circle defined by the bolt holes;

bushings extending through the bolt holes wherein each bushing of the bushings passes through a corresponding bolt hole; each bushing of the bushings comprising:

a head at a first end of the bushing bearing against the first side of the disc pack;

a second end opposite the first end, the second end extending axially outside the bolt hole, the second end configured to be received at least partially into a locating pocket of a first flange or a second flange of a centerpiece;

a body extending between the head and the second end;

a washer press fit over the body and surrounding at least a portion of the second end and bearing against the second side of the disc pack such that the washer holds the disc plates together;

wherein the bolt circle of the disc pack has a first diameter that is configured to increase to a second diameter when the disc pack is coupled either to the first flange or the second flange of the centerpiece; and wherein the second diameter is at least 0.37% greater than the first diameter.

2. The disc pack of claim 1, wherein the second diameter is between 0.37% and 0.74% greater than the first diameter.

3. The disc pack of claim 2, the body extending between the head of each bushing and the second end of each bushing, the body and the second end extending to a terminal end thereof having an outermost body periphery that is circular.

4. The disc pack of claim 1, wherein each bushing of the bushings is T-shaped, the head of each bushing of the bushings having an outermost diameter that is greater than a second diameter defined by the second end of each bushing of the bushings.

5. The disc pack of claim 4, wherein each bushing of the bushings has internal threads extending an entire longitudinal length of the bushing.

6. The disc pack of claim 5, wherein the head of each bushing of the bushings is sized to be a first locator for reception into a clearance hole of a mating flange.

7. The disc pack of claim 4, wherein the second end of each bushing of the bushings has a circumferential chamfer.

8. The disc pack of claim 7, wherein the second end of each bushing of the bushings is sized to be a second locater for reception into the locating pocket in the first flange or the second flange.

9. The disc pack of claim 1, wherein each head of each bushing includes either a hex head or a hex key.

10. A centerpiece assembly for a coupling assembly, the centerpiece assembly comprising:

a centerpiece comprising:

a first flange at a first end of the centerpiece;

a second flange opposite the first flange at a second end of the centerpiece;

a pair of the disc packs of claim 1 comprising a first disc pack and a second disc pack;

wherein the first disc pack comprises stacked first disc plates, the first disc pack coupled to the first flange;

wherein the second disc pack comprises stacked second disc plates, the second disc pack coupled to the second flange; and each one of the bushings of the first disc pack and the second disc pack comprising:

the body surrounded by a corresponding one of the corresponding bolt holes.

11. The centerpiece assembly of claim 10, comprising a first adapter plate coupled to the first disc pack such that the first disc pack is located between the first adapter plate and the first flange and a second adapter plate coupled to the second disc pack such that the second disc pack is located between the second adapter plate and the second flange;

wherein the first adapter plate and the second adapter plate each comprise:

an adapter plate bolt circle greater than the first diameter of the bolt circle of the first disc pack and the second disc pack and equal to the second diameter of the first disc pack and the second disc pack when the adapter plate is coupled to the first disc pack and the second disc pack:

a center cavity in an outwardly axially facing side, the center cavity sized and located to receive at least a portion of a hub therein to mount the centerpiece assembly to the hub.

12. The centerpiece assembly of claim 11, comprising fasteners threaded through a corresponding bushing to couple:

(i) the first disc pack to the first flange;

(ii) the second disc pack to the second flange;

(iii) the first adapter plate to the first disc pack;

(iv) the second adapter plate to the second disc pack.

13. The centerpiece assembly of claim 12, wherein each one of the first flange, the second flange, the first adapter plate, and the second adapter plate define a corresponding set of counterbores that define a corresponding bolt circle, each one of the corresponding set of counterbores is a locating pocket having a first opening of a first locating diameter and a second opening opposite the first opening of a second locating diameter less than the first locating diameter, the corresponding set of counterbores are through holes evenly spaced apart from one another along the corresponding bolt circle.

14. The centerpiece assembly of claim 13, wherein a corresponding one of the second end of each bushing is at least partially surrounded by a corresponding locating pocket.

15. The centerpiece assembly of claim 14, wherein a portion of each one of the fasteners is surrounded by an unthreaded portion of the corresponding locating pocket of the second locating diameter.

16. The centerpiece assembly of claim 15, wherein another portion of each one of the fasteners is threadingly received into the corresponding one of the second end of each bushing, the corresponding one of the second end of each one of the bushings surrounded by a portion of a counterbore of the corresponding set of counterbores of the first locating diameter.

17. A coupling assembly comprising:

the centerpiece assembly of claim 11, further comprising:

a first hub mounted to the first adapter plate, the first hub configured to be mounted to a drive end of an apparatus; and a second hub mounted to the second adapter plate, the second hub configured to be mounted to a driven end of a device.

18. The centerpiece assembly of claim 10, wherein internal threads of each bushing extend an entire longitudinal length of each bushing and wherein outermost peripheral surfaces of the body and the second end of each of the bushings are circular and free of threads.

19. The centerpiece assembly of claim 18, wherein each one of the first flange, the second flange, the first adapter plate, and the second adapter plate define a corresponding set of clearance holes that are through holes and that are evenly spaced apart and are located along the corresponding bolt circle, a corresponding clearance hole of the corresponding set of clearance holes surrounding at least partially the head of a corresponding bushing such that a retention member is defined by the head and the corresponding clearance hole.

20. A coupling assembly comprising:

the centerpiece assembly of claim 10, further comprising:

a first hub having a first hub flange mounted to the first disc pack, the first hub configured to be mounted to a drive end of an apparatus; and a second hub having a second hub flange mounted to the second disc pack, the second hub configured to be mounted to a driven end of a device.

* * * * *